US007003162B2

(12) United States Patent
Ohashi

(10) Patent No.: US 7,003,162 B2
(45) Date of Patent: Feb. 21, 2006

(54) APPARATUS AND METHOD FOR EXAMINING IMAGES

(75) Inventor: Katsumi Ohashi, Kyoto (JP)

(73) Assignee: Omron Corporation, (JP)

( * ) Notice: Subject to any disclaimer, the term of this patent is extended or adjusted under 35 U.S.C. 154(b) by 691 days.

(21) Appl. No.: 09/995,204

(22) Filed: Nov. 27, 2001

(65) Prior Publication Data

US 2002/0097908 A1    Jul. 25, 2002

(30) Foreign Application Priority Data

Nov. 27, 2000   (JP)   ............................. 2000-360275

(51) Int. Cl.
*G06K 9/68* (2006.01)
(52) U.S. Cl. ...................................... 382/218; 382/309
(58) Field of Classification Search ................ 382/112, 382/217, 218, 309
See application file for complete search history.

(56) References Cited

U.S. PATENT DOCUMENTS

| 5,329,598 | A | * | 7/1994 | Geist ........................... 382/228 |
| 5,764,813 | A | * | 6/1998 | Murayama et al. ......... 382/271 |
| 5,909,509 | A | * | 6/1999 | Chiang et al. .............. 382/228 |
| 6,198,846 | B1 | * | 3/2001 | Nishiwaki ................... 382/178 |
| 6,246,794 | B1 | * | 6/2001 | Kagehiro et al. ........... 382/185 |

FOREIGN PATENT DOCUMENTS

| JP | 3-55679 | | 3/1991 |
| JP | 6-309507 | | 11/1994 |
| JP | 8-263655 | | 10/1996 |
| JP | 08320931 A | * | 12/1996 |
| JP | 09120432 A | * | 5/1997 |
| JP | 11-224338 | | 8/1999 |
| JP | 2000082113 A | * | 3/2000 |
| JP | P2000-182048 | | 6/2000 |

OTHER PUBLICATIONS

Patent Abstracts of Japan, Publication No. 03-055679 dated Mar. 11, 1991, 1 page.
Patent Abstracts of Japan, Publication No. 06-309507 dated Nov. 4, 1994, 1 page.
Patent Abstracts of Japan, Publication No. 08-263655 dated Oct. 11, 1996, 1 page.
Patent Abstracts of Japan, Publication No. 11-224338 dated Aug. 17, 1999, 1 page.
Patent Abstracts of Japan, Publication No. 2000-182048 dated Jun. 30, 2000, 1 page.

* cited by examiner

*Primary Examiner*—Vikkram Bali
*Assistant Examiner*—Colin LaRose
(74) *Attorney, Agent, or Firm*—Osha Liang LLP

(57) ABSTRACT

An apparatus for examining printed characters is disclosed. The apparatus includes a database storing standard characters, means for inputting and storing a reference character, means for acquiring an actual image of a printed character, means for calculating a similarity degree between the actual image of the printed character and an image of a standard character stored in the database, and means for retrieving a first candidate character having a highest similarity degree to the printed character from the standard characters stored in the database and comparing the first candidate character with the reference character. If the first candidate character retrieved from the database equates to the reference character, the printed character is determined to be correct. If the first candidate character retrieved from the database does not equate to the reference character, the printed character is determined to be incorrect.

12 Claims, 25 Drawing Sheets

EXAMINATION IMAGE

FIG. 11(a)

CHARACTER CANDIDATE FOR "3"

| RANK | CANDIDATE | SIMILARITY DEGREE |
|---|---|---|
| 1 | 3 | 89 |
| 2 | B | 50 |
| 3 | 8 | 45 |

FIG. 11(b)

CHARACTER CANDIDATE FOR "."

| RANK | CANDIDATE | SIMILARITY DEGREE |
|---|---|---|
| 1 | . | 95 |
| 2 | , | 50 |
| 3 | ' | 40 |

FIG. 11(c)

CHARACTER CANDIDATE FOR "1"

| RANK | CANDIDATE | SIMILARITY DEGREE |
|---|---|---|
| 1 | 1 | 85 |
| 2 | I | 60 |
| 3 | / | 36 |

FIG. 11(d)

CHARACTER CANDIDATE FOR "1"

| RANK | CANDIDATE | SIMILARITY DEGREE |
|---|---|---|
| 1 | 1 | 86 |
| 2 | I | 65 |
| 3 | / | 45 |

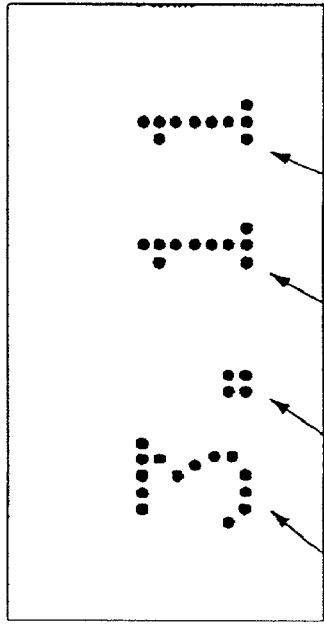
FIG. 12 (a) EXAMINATION IMAGE
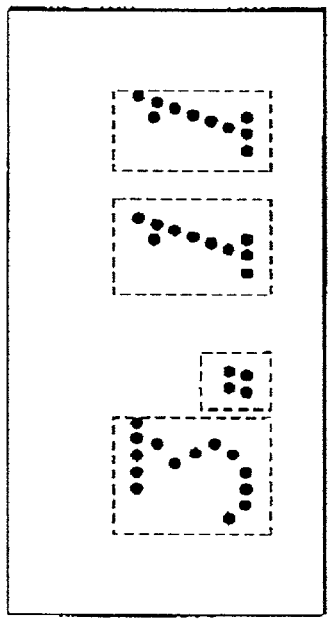
FIG. 12 (b) CHARACTER STRING OF 1ST-RANKED CANDIDATE
(COLLATION)
FIG. 12 (c)
| REGISTERED CHARACTER STRING | 3 | . | 1 | 1 |
|---|---|---|---|---|
| CHARACTER CODE (ASCII CODE, ETC.) | 0 x 0033 | 0 x 002e | 0 x 0031 | 0 x 0031 |

| 1 | 1 | 1 | *1* |
| 2 | 2 | 2 | 2 |
| 3 | 3 | 3 | 3 |
| 4 | 4 | 4 | 4 |

FIG. 15

|  | DETERMINING VALUE TH1 | DETERMINING VALUE TH2 |
|---|---|---|
| CRITERIA A | 90 | 30 |
| CRITERIA B | 70 | 30 |
| CRITERIA C | 70 | 10 |

(NORMALIZED WITH 100)

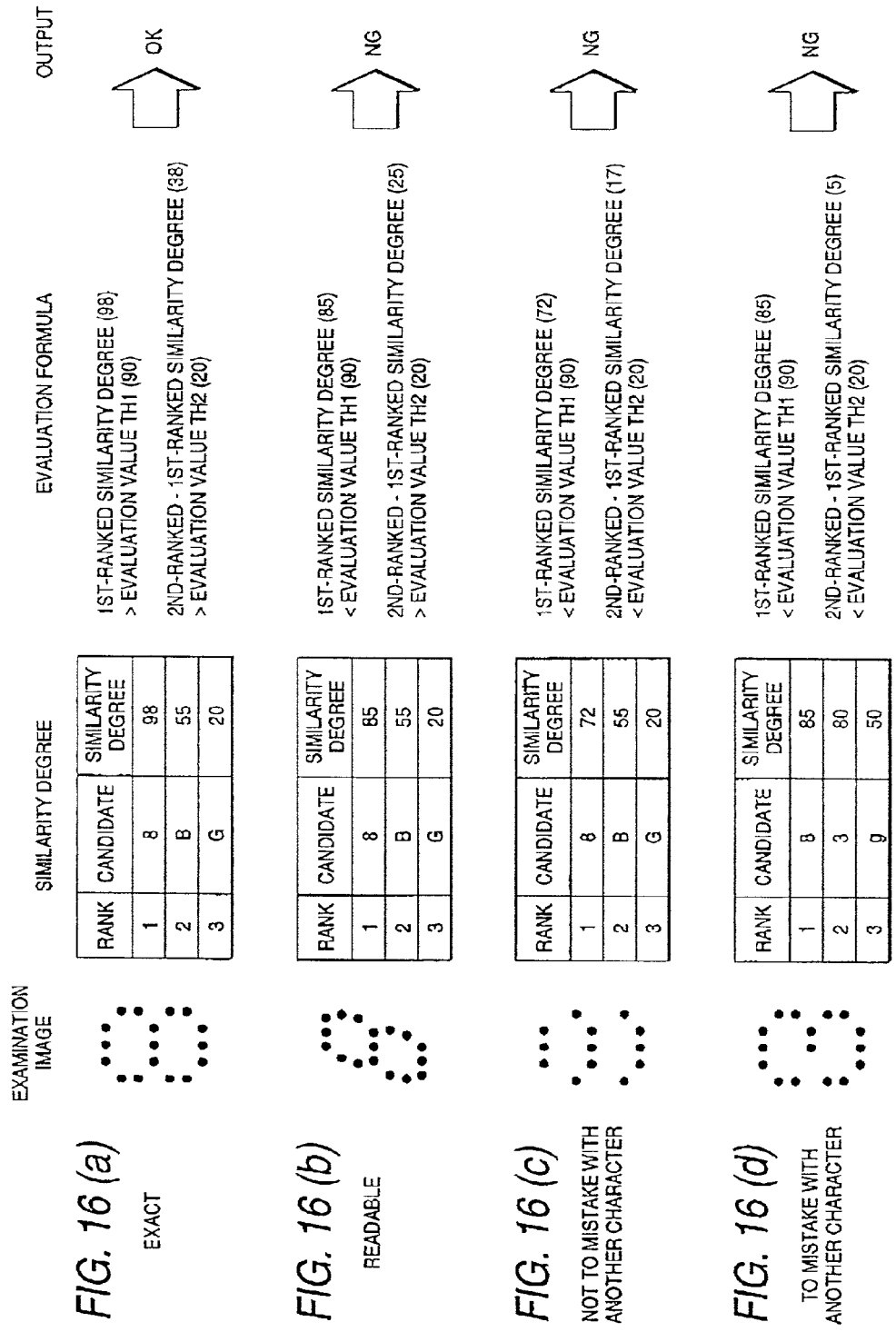

| | EXAMINATION IMAGE | SIMILARITY DEGREE | | EVALUATION FORMULA | OUTPUT |
|---|---|---|---|---|---|
| FIG. 17 (a)<br>EXACT | 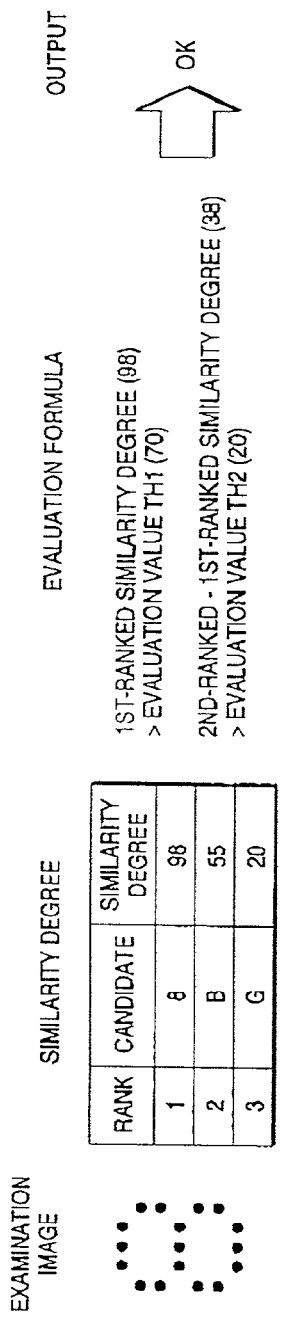 | RANK / CANDIDATE / SIMILARITY DEGREE<br>1 / 8 / 98<br>2 / B / 55<br>3 / G / 20 | | 1ST-RANKED SIMILARITY DEGREE (98)<br>> EVALUATION VALUE TH1 (70)<br><br>2ND-RANKED − 1ST-RANKED SIMILARITY DEGREE (38)<br>> EVALUATION VALUE TH2 (20) | ⇧ OK |
| FIG. 17 (b)<br>READABLE | 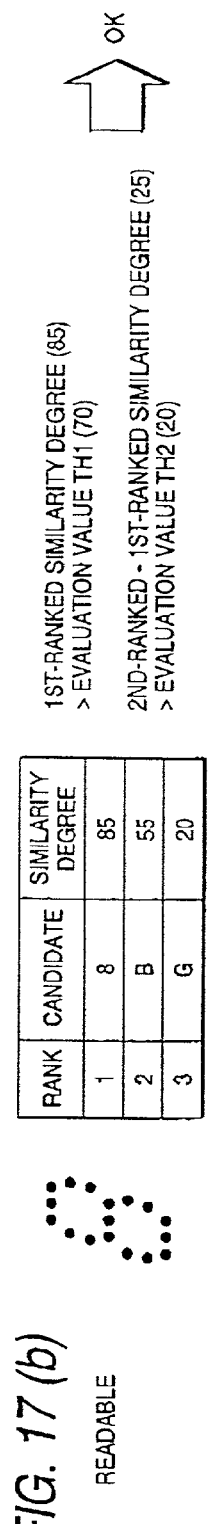 | RANK / CANDIDATE / SIMILARITY DEGREE<br>1 / 8 / 85<br>2 / B / 55<br>3 / G / 20 | | 1ST-RANKED SIMILARITY DEGREE (85)<br>> EVALUATION VALUE TH1 (70)<br><br>2ND-RANKED − 1ST-RANKED SIMILARITY DEGREE (25)<br>> EVALUATION VALUE TH2 (20) | ⇧ OK |
| FIG. 17 (c)<br>NOT TO MISTAKE WITH ANOTHER CHARACTER | 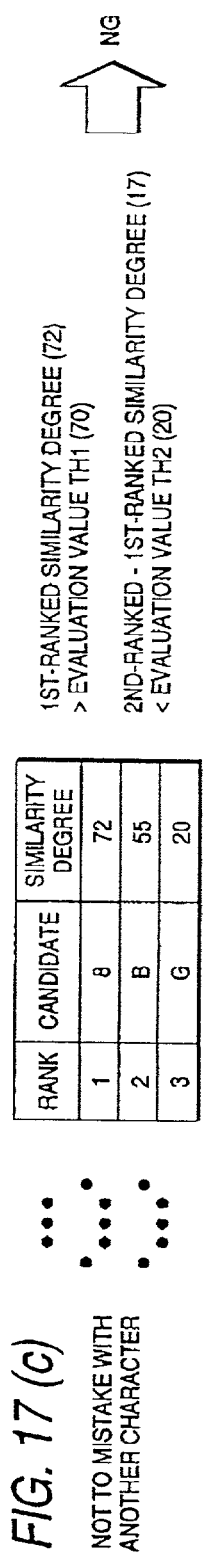 | RANK / CANDIDATE / SIMILARITY DEGREE<br>1 / 8 / 72<br>2 / B / 55<br>3 / G / 20 | | 1ST-RANKED SIMILARITY DEGREE (72)<br>> EVALUATION VALUE TH1 (70)<br><br>2ND-RANKED − 1ST-RANKED SIMILARITY DEGREE (17)<br>> EVALUATION VALUE TH2 (20) | ⇧ NG |
| FIG. 17 (d)<br>TO MISTAKE WITH ANOTHER CHARACTER | 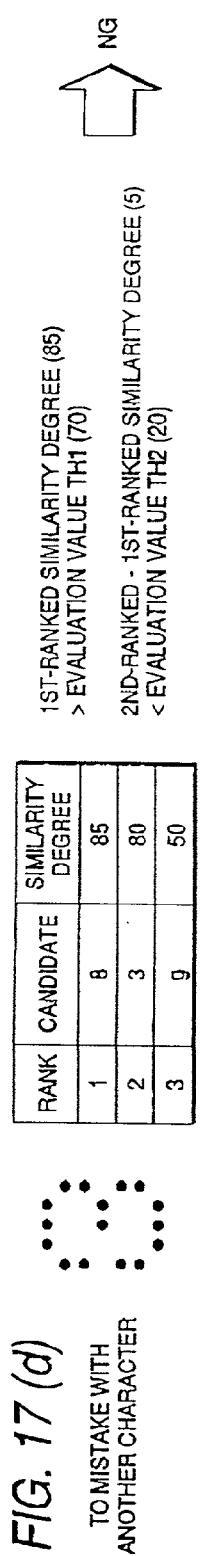 | RANK / CANDIDATE / SIMILARITY DEGREE<br>1 / 8 / 85<br>2 / 3 / 80<br>3 / 9 / 50 | | 1ST-RANKED SIMILARITY DEGREE (85)<br>> EVALUATION VALUE TH1 (70)<br><br>2ND-RANKED − 1ST-RANKED SIMILARITY DEGREE (5)<br>< EVALUATION VALUE TH2 (20) | ⇧ NG |

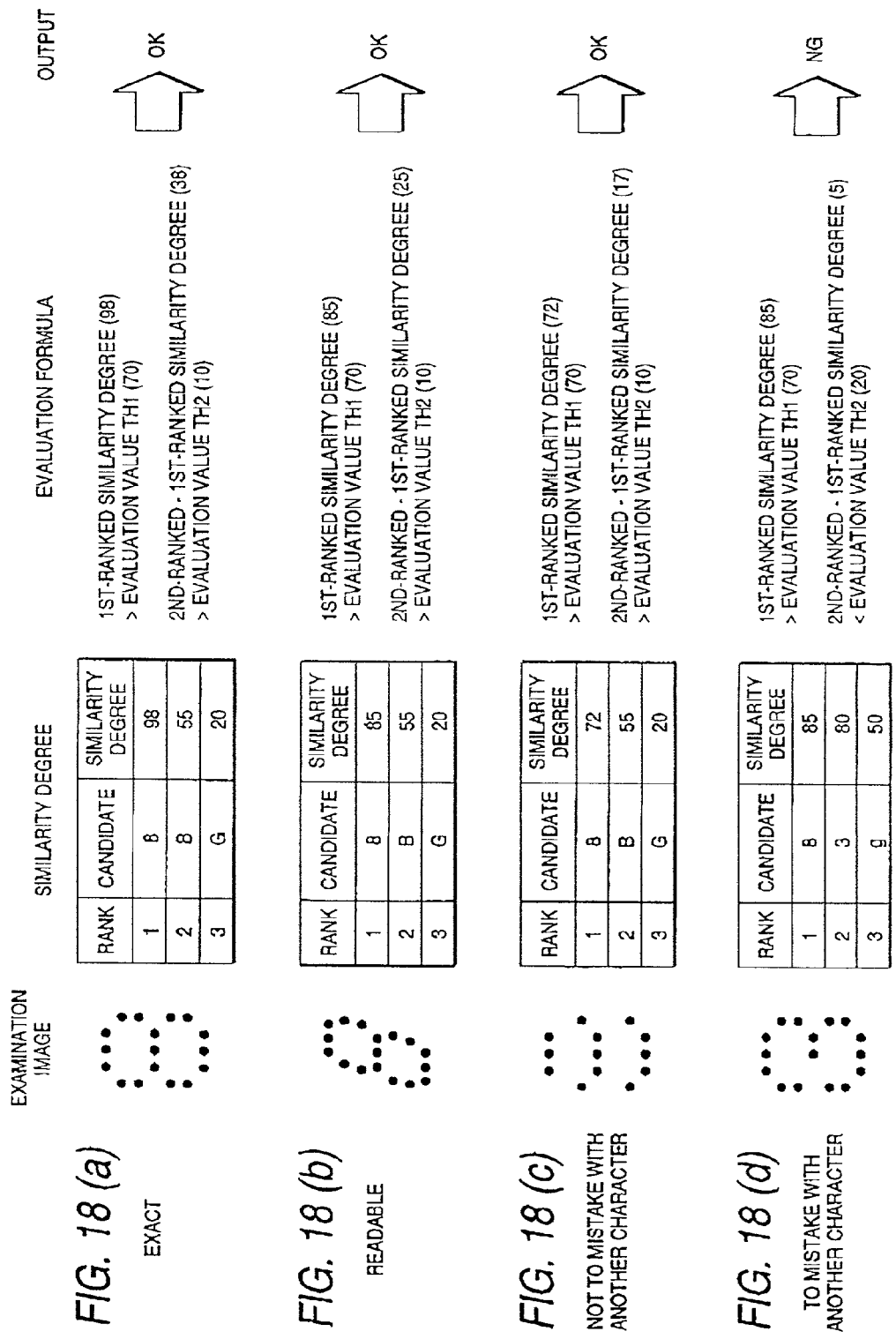

FIG. 20

| 90 | 90 | 90 | 100 | 100 | 130 | 110 | 90 | 90 | 80 | 90 | 90 | 90 | 90 |
|---|---|---|---|---|---|---|---|---|---|---|---|---|---|
| 100 | 100 | 100 | 100 | 110 | 150 | 130 | 100 | 90 | 90 | 90 | 90 | 90 | 90 |
| 110 | 110 | 110 | 110 | 130 | 130 | 170 | 150 | 110 | 90 | 90 | 90 | 90 | 90 |
| 150 | 180 | 170 | 170 | 170 | 170 | 170 | 170 | 170 | 170 | 170 | 170 | 170 | 170 |
| 130 | 130 | 140 | 160 | 160 | 110 | 90 | 130 | 180 | 170 | 130 | 110 | 120 | 120 |
| 80 | 90 | 100 | 150 | 160 | 130 | 80 | 110 | 170 | 160 | 130 | 90 | 80 | 70 |
| 50 | 80 | 90 | 110 | 150 | 130 | 90 | 90 | 160 | 170 | 150 | 80 | 90 | 70 |
| 50 | 80 | 90 | 90 | 100 | 130 | 150 | 140 | 170 | 140 | 120 | 100 | 80 | 80 |
| 70 | 90 | 100 | 90 | 110 | 150 | 190 | 180 | 150 | 110 | 80 | 90 | 80 | 80 |
| 80 | 90 | 90 | 120 | 130 | 150 | 180 | 200 | 160 | 130 | 90 | 90 | 80 | 70 |
| 80 | 90 | 100 | 110 | 150 | 170 | 100 | 100 | 170 | 170 | 130 | 90 | 80 | 80 |
| 90 | 100 | 130 | 150 | 130 | 110 | 90 | 90 | 110 | 180 | 160 | 100 | 80 | 80 |
| 130 | 150 | 170 | 130 | 110 | 90 | 90 | 90 | 100 | 110 | 120 | 150 | 180 | 130 |
| 150 | 180 | 110 | 120 | 100 | 90 | 90 | 90 | 90 | 110 | 110 | 170 | 160 | 190 |

FIG. 21

| LUMINANCE VALUE | LUMINANCE |
|---|---|
| 0 | 0 |
| 10 | 0 |
| 20 | 0 |
| 30 | 0 |
| 40 | 0 |
| 50 | 1 |
| 60 | 1 |
| 70 | 4 |
| 80 | 20 |
| 90 | 48 |
| 100 | 18 |
| 110 | 21 |
| 120 | 6 |
| 130 | 20 |
| 140 | 3 |
| 150 | 15 |
| 160 | 8 |
| 170 | 22 |
| 180 | 7 |
| 190 | 1 |
| 200 | 1 |
| 210 | 0 |
| 220 | 0 |
| 230 | 0 |
| 240 | 0 |
| 250 | 0 |
| 260 | 0 |

| LUMINANCE VALUE BEFORE CONVERSION (X) | LUMINANCE VALUE AFTER CONVERSION (Y) |
|---|---|
| X ≤ 80 | Y = 0 |
| 80 < X < 170 | $Y = \dfrac{255}{(170-80)} X - \dfrac{80 \times 255}{(170-80)}$ |
| 170 ≤ X | Y = 255 |

FIG. 24

| 28 | 28 | 28 | 57 | 57 | 142 | 85 | 28 | 28 | 0 | 28 | 28 | 28 | 28 |
|---|---|---|---|---|---|---|---|---|---|---|---|---|---|
| 57 | 57 | 57 | 57 | 85 | 198 | 142 | 57 | 28 | 28 | 28 | 28 | 28 | 28 |
| 85 | 85 | 85 | 85 | 142 | 142 | 255 | 198 | 85 | 28 | 28 | 28 | 28 | 28 |
| 198 | 255 | 255 | 255 | 255 | 255 | 255 | 255 | 255 | 255 | 255 | 255 | 255 | 255 |
| 142 | 142 | 170 | 227 | 227 | 85 | 28 | 142 | 255 | 255 | 142 | 85 | 113 | 113 |
| 0 | 28 | 85 | 198 | 227 | 142 | 0 | 57 | 255 | 227 | 142 | 28 | 0 | 0 |
| 0 | 0 | 28 | 85 | 198 | 142 | 28 | 28 | 227 | 255 | 198 | 0 | 28 | 0 |
| 0 | 0 | 28 | 28 | 57 | 142 | 198 | 170 | 255 | 170 | 113 | 57 | 0 | 0 |
| 0 | 28 | 57 | 28 | 85 | 198 | 255 | 255 | 198 | 85 | 0 | 28 | 0 | 0 |
| 0 | 28 | 28 | 113 | 142 | 198 | 255 | 255 | 227 | 142 | 28 | 28 | 0 | 0 |
| 0 | 28 | 57 | 85 | 198 | 255 | 57 | 57 | 255 | 255 | 142 | 28 | 0 | 0 |
| 28 | 57 | 142 | 198 | 142 | 85 | 28 | 28 | 85 | 255 | 227 | 85 | 0 | 0 |
| 142 | 198 | 255 | 142 | 85 | 28 | 28 | 28 | 57 | 85 | 113 | 198 | 255 | 142 |
| 198 | 255 | 85 | 113 | 57 | 28 | 28 | 28 | 28 | 85 | 85 | 255 | 227 | 225 |

FIG. 25 (a)

| 1 | 2 | 1 |
|---|---|---|
| 0 | 0 | 0 |
| -1 | -2 | -1 |

FIG. 25 (b)

| 2 | 1 | 0 |
|---|---|---|
| 1 | 0 | -1 |
| 0 | -1 | -2 |

FIG. 25 (c)

| 1 | 0 | -1 |
|---|---|---|
| 2 | 0 | -2 |
| 1 | 0 | -1 |

FIG. 25 (d)

| 0 | -1 | -2 |
|---|---|---|
| 1 | 0 | -1 |
| 2 | 1 | 0 |

FIG. 25 (e)

| -1 | -2 | -1 |
|---|---|---|
| 0 | 0 | 0 |
| 1 | 2 | 1 |

FIG. 25 (f)

| -2 | -1 | 0 |
|---|---|---|
| -1 | 0 | 1 |
| 0 | 1 | 2 |

FIG. 25 (g)

| -1 | 0 | 1 |
|---|---|---|
| -2 | 0 | 2 |
| -1 | 0 | 1 |

FIG. 25 (h)

| 0 | 1 | 2 |
|---|---|---|
| -1 | 0 | 1 |
| -2 | -1 | 0 |

FIG. 26 (a)

| a1 | a2 | a3 |
|----|----|----|
| a4 | a5 | a6 |
| a7 | a8 | a9 |

FIG. 26 (b)

| m1 | m2 | m3 |
|----|----|----|
| m4 | m5 | m6 |
| m7 | m8 | m9 |

FIG. 27 (a)

| d1 | d2 | d5 | d6 |
|----|----|----|----|
| d3 | d4 | d7 | d8 |

FIG. 27 (b)

| D1 | D2 |
|----|----|

FIG. 28

| 0.0 | 0.024 | 0.03 | 0.024 | 0.0 |
|---|---|---|---|---|
| 0.024 | 0.06 | 0.08 | 0.06 | 0.024 |
| 0.03 | 0.08 | 0.11 | 0.08 | 0.03 |
| 0.024 | 0.06 | 0.08 | 0.06 | 0.024 |
| 0.0 | 0.024 | 0.03 | 0.024 | 0.0 |

SIMILAR-CHARACTER CODE TABLE

| SET NUMBER | | | |
|---|---|---|---|
| 1 (NUMBER OF SET CHARACTERS OF 3) | 0 (ZERO) | O (CAPITAL LETTER O) | o (LOWER CASE o) |
| 2 (NUMBER OF SET CHARACTERS OF 2) | g (LOWER CASE g) | 9 (NINE) | |
| 3 (NUMBER OF SET CHARACTERS OF 3) | 1 (ONE) | l (LOWER CASE l) | I (CAPITAL LETTER I) |

FIG. 34

SORT RESULT ACCORDING TO SIMILARITY DEGREE

| RANK | CANDIDATE | SIMILARITY DEGREE |
|---|---|---|
| 1 | l (LOWER CASE l) | 90 |
| 2 | 1 (ONE) | 89 |
| 3 | 7 (SEVEN) | 67 |
| 4 | I (CAPITAL LETTER I) | 65 |
| | | |

CONTINUING SIMILAR CHARACTERS N = 2

CANDIDATE RANK COINCIDENT WITH REGISTERED CAHACTER CODE S = 2

FIG. 35

SORT RESULT ACCORDING TO SIMILARITY DEGREE

| RANK | CANDIDATE | SIMILARITY DEGREE |
|---|---|---|
| 1 | l (LOWER CASE l) | 90 |
| 2 | I (CAPITAL LETTER I) | 65 |
| 3 | 7 (SEVEN) | 67 |
| 4 | 1 (ONE) | 89 |
| | | |

CONTINUING SIMILAR CHARACTERS N = 2

CANDIDATE RANK COINCIDENT WITH REGISTERED CAHACTER CODE S = 4

APPARATUS AND METHOD FOR EXAMINING IMAGES

BACKGROUND OF INVENTION

The present invention relates to an apparatus and method for examining images, and more particularly, to an image examination apparatus for determining a character as a subject of examination as to good/not-good, on the basis of an image obtained by shooting a character or the like as a subject of examination.

In the process to print predetermined characters, symbols or the like, such as product name and type, serial number, date, etc. (hereinafter, referred merely to as characters) on the product or package thereof, there is a need for a process to examine the result of print and check for improper printing, such as blurs and distortions.

The methods for automating the examination process as above include a disclosure, e.g., in JP-A-11-283039. In the conventional image examining apparatus, an imaging device previously reads out a well-quality character to register a preferred character image. Then, a character as a subject of examination is read out of the imaging device, to determine a difference in brightness at portions between registered character image and the examination image, to detect as a differential image a portion that the difference of brightness is in excess of a predetermined threshold.

It is assumed that, for example, a good image "0" is registered as a registered image 1 as shown in FIG. 1. In this case, if an examination image 2 be also shot as a good image similarly to the registered image 1, a differential image 3 will not appear as shown in the figure, thus determining the examination image 2 good (OK). On the contrary, if the examination image 2 has a break-off or blur in a lower part of the character "0" as shown in FIG. 2, the broken or blurred part is detected as a differential image 3. Thus, the examination image 2 is determined not-good (NG).

However, the image examining apparatus like this uses the determination criteria different from the criteria of determination by the human, e.g. in image differential area, thus making possible to compare between the characters different in size. However, where the registered image 1 and the examination image 2 are different in font as shown in FIG. 3 or any one is in italic or bold as shown in FIG. 4, a differential image 3 appears to determine an examination result inconveniently as not-good. Consequently, each time the character or font is changed, it is required for the image examining apparatus to read out the quite same image as the examination image 2 by the imaging device and previously store it as registered image 1.

The use of the image examining apparatus makes possible to automate the examination process. However, there is troublesome operation in reading a character as a subject of examination from the imaging device and registering it as in the above manner each time the subject of examination is changed. Excepting special symbols and marks, it is desired to readily input and register a character as a subject of examination through an input unit, such as a keyboard or console.

However, as long as the examining character is inputted on an input unit without having an imaging function, such as a keyboard or console, (or without using the imaging function), there is a need to determine the character in such a range as can be read by the human. For a character 5 different in size from a standard character 4 as shown in FIG. 5, tilted character 6, character 7 different in linewidth (in the entire or a part), italic character 8, non-continuous character (slightly broken as compared to the entire character) 9, character 10 different in character width and so on, it is desired to determine a presence or absence of improper print due to break-off, blur or the like while determining the same character as the standard character 4 and allowing the difference in font or the like.

Meanwhile, there is, as a character recognition technology, a disclosure in JP-A-7-65126. This technology, a technology for unknown character recognition, could not have been used in the application of collation, examination or the like to recognize an existing character as to good/not-good.

SUMMARY OF INVENTION

It is an object of the present invention to eliminate the necessity to register, one by one, characters or the like in the form of an image as a reference of examination from an imaging device and to make possible good/not-good determination of characters or the like with accuracy.

In general, in one aspect, the present invention relates to an apparatus for examining printed characters which comprises a database storing standard characters, means for inputting and storing a reference character, means for acquiring an actual image of a printed character, means for calculating a similarity degree between the actual image of the printed character and an image of a standard character stored in the database, and means for retrieving a first candidate character having a highest similarity degree to the printed character from the standard characters stored in the database and comparing the first candidate character with the reference character. If the first candidate character retrieved from the database equates to the reference character, the printed character is determined to be good. If the first candidate character retrieved from the database does not equate to the reference character, the printed character is determined to be not-good.

According to the apparatus, because an image recognition technology is utilized to carry out good/not-good determination on the image, input can be made as a character code through an external unit, such as a keyboard, without the necessity to image-input character data as a reference of examination. Consequently, it is possible to easily, swiftly input image information as a reference of examination in the form of a character code. Meanwhile, even unless previously teaching the same characters or the like different in font or character shape, good/not-good determination can be carried out on image information as a subject of examination on the basis of determining as the same character the characters or the like different in font or shape.

In one embodiment of the apparatus of the present invention, the image information of the database highest in the similarity degree calculated by the calculation means is compared with the image information as a reference of examination stored in the storage device, thereby making possible to determine as to good/not-good of the image information acquired by the image information acquiring device. For example, it is possible to determine an examination image as good when there is coincidence between the image information highest in similarity degree and the image information as a subject of examination. This embodiment can simplify the process of good/not-good determination.

Also, in another embodiment of an image examining apparatus of the invention, further comprised is a device for comparing the similarity degree calculated by the calculation means with a predetermined determining value depending upon a result of comparison of which good/not-good determination on the image information as a subject of examination may be complemented for. This embodiment adjusts a value of a determining value thereby making possible to adjust a reference of good/not-good determination and, for example, bring it near the good/not-good determination due to human vision.

Also, in still another embodiment of an image examining apparatus of the invention, further comprised is a similar image character table for storing a similar-image information list set with similar characters, the image information as an examination reference stored in the means for storing a reference character being compared with the image information correlated through the similar-image information list to the image information of the database highest in similarity degree calculated by the calculation means thereby determining as to good/not-good on the image information acquired by the image information acquiring means. In this embodiment, because the similar pieces of image information are correlated through a similar-image information list, image information can be determined as to good/not-good by taking account of the image information ready to be erroneously recognized, thus improving the accuracy of good/not-good determination.

In general, in one aspect, the present invention relates to a method for examining printed characters which comprises storing standard characters in a database, inputting and storing a reference character, acquiring an actual image of a printed character, calculating a similarity degree between the actual image of the printed character and an image of a standard character stored in the database, and retrieving a first candidate character having a highest similarity degree to the printed character from the database and comparing the first candidate character with the reference character. If the first candidate character retrieved from the database equates to the reference character, the printed character is determined to be good. If the first candidate character retrieved from the standard characters stored in the database does not equate to the reference character, the printed character is determined to be not-good.

According to the apparatus, because an image recognition technology is utilized to carry out good/not-good determination on the image, input can be made as a character code through an external unit, such as a keyboard, without the necessity to image-input character data as a reference of examination. Consequently, it is possible to easily, swiftly input image information as a reference of examination in the form of a character code. Meanwhile, even unless previously teaching the same characters or the like different in font or character shape, good/not-good determination can be carried out on image information as a subject of examination on the basis of determining as the same character the characters or the like different in font or shape.

Also, in an embodiment of the method of the present invention, image information highest in similarity degree is compared with a first determining value, a difference by subtraction of a similarity degree of image information second highest in similarity degree from a similarity degree of the image information highest in similarity degree being compared with a second determining value, depending upon a result of comparison of which good/not-good determination on image information as a subject of examination is complemented for. This embodiment adjusts a value of a determining value thereby making possible to adjust a reference of good/not-good determination and, for example, bring it near the good/not-good determination due to human vision.

In another embodiment of the method of the present invention, previously stored is a similar-image information list set with similar characters, the image information as a subject of examination being compared with any of pieces of image information of among image information correlated through a similar-image information list to image information highest in similarity degree thereby determining as to good/not-good on the image information as a subject of examination. In this embodiment, because the similar pieces of image information are correlated through a similar-image information list, image information can be determined as to good/not-good by taking account of the image information ready to be erroneously recognized, thus improving the accuracy of good/not-good determination.

Note that the constituent elements of the invention explained above can be combined where possible. Also, the similarity degree in the below embodiment is calculated based on character. This however does not prevent the calculation of a similarity degree based on a character string (plural characters).

Other aspects and advantages of the invention will be apparent from the following description and the appended claims.

BRIEF DESCRIPTION OF DRAWINGS

FIGS. 11A, 11B, 11C and 11D are a figure showing a similarity degree of each character image cut in FIG. 10 to a candidate character;

FIG. 12A is a figure showing an examination image,

FIG. 12B a figure showing a character string arranged with first-ranked candidate characters, and FIG. 12C a figure showing a registered characters (codes);

FIG. 15 is a figure showing some criteria having different determining values TH1, TH2;

FIG. 16A–FIG. 16D are figures representing a process to determine some examining images of among those of FIG. 14 using the criteria A of FIG. 15;

FIG. 17A–FIG. 17D are figures representing a process to determine some examining images of among those of FIG. 14 using the criteria B of FIG. 15;

FIG. 18A–FIG. 18D are figures representing a process to determine some examining images of among those of FIG. 14 using the criteria C of FIG. 15;

FIG. 20 is a figure representing luminance values of an examination image obtained by shooting;

FIG. 21 is a figure representing a luminance-value histogram;

FIG. 24 is a figure representing a luminance value of a character image of after luminance value conversion;

FIGS. 25A–FIG. 25H are a figure showing a Robinson's edge detecting operator;

FIG. 26A is a figure representing, together with a luminance value, a part of an image of after luminance value conversion and FIG. 26B is a figure showing a Robinson's edge detecting operator;

FIG. 27A is a figure showing, together with a concentration gradient value, a part of an image and FIG. 27B a figure showing, together with an averaged concentration gradient value, a part of an image;

FIG. 28 is a figure showing a Gaussian distribution mask;

FIG. 29 is a figure showing positions where the Gaussian distribution mask is applied;

FIG. 33 is a figure representing a similar-character code table;

FIG. 34 is a figure showing one example of a sort result of candidate characters similar to the examination image; and FIG. 35 is a figure showing another example of a sort result of candidate characters similar to the examination image.

DETAILED DESCRIPTION

Figure 1:
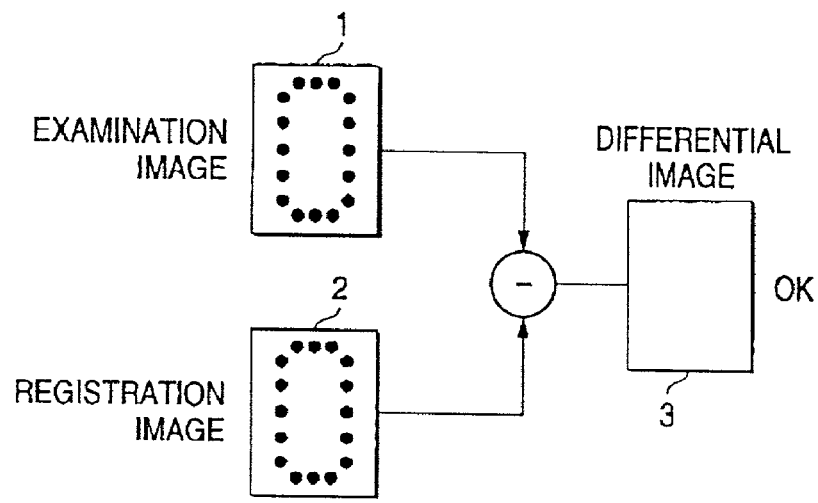
FIG. 1 is a figure for explaining a method for good/not-good determination of characters or the like by a related art image examining apparatus, representing an example that an examination image is determined good (OK)
Figure 2:
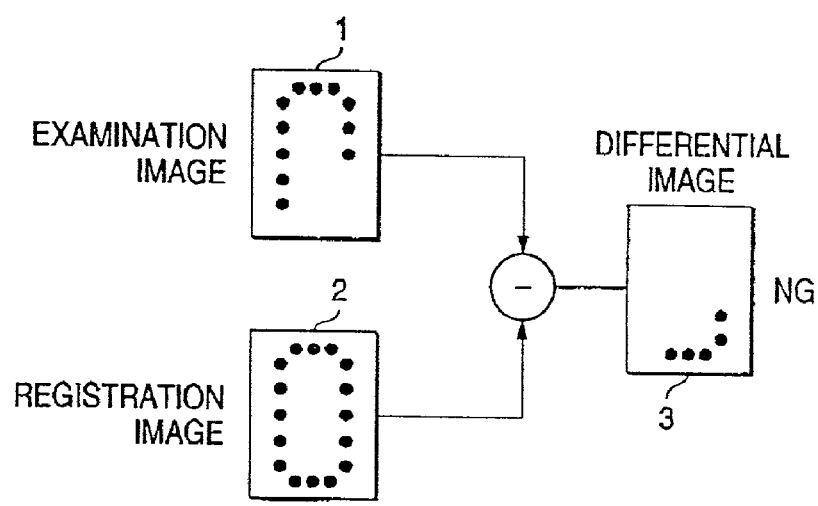
FIG. 2 shows an example that an examination image is determined not good (NG) in the same image examination.
Figure 3:
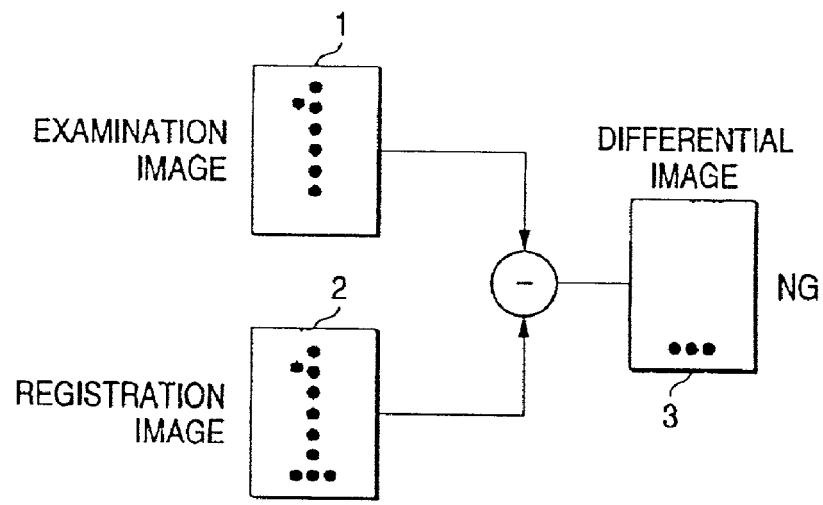
FIG. 3 shows a case determined not good due to the difference in font despite the same character in the same image examination.
Figure 4:
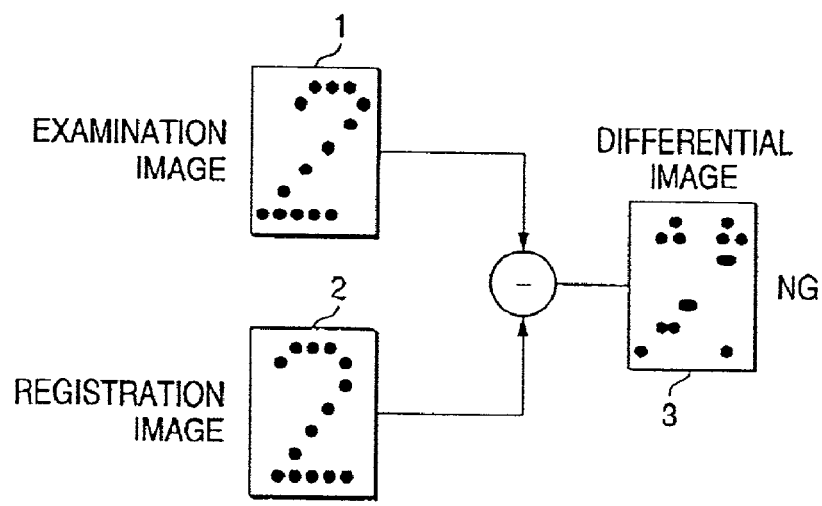
FIG. 4 shows a case determined not good due to an italic character despite the same character in the same image examination.
Figure 5:
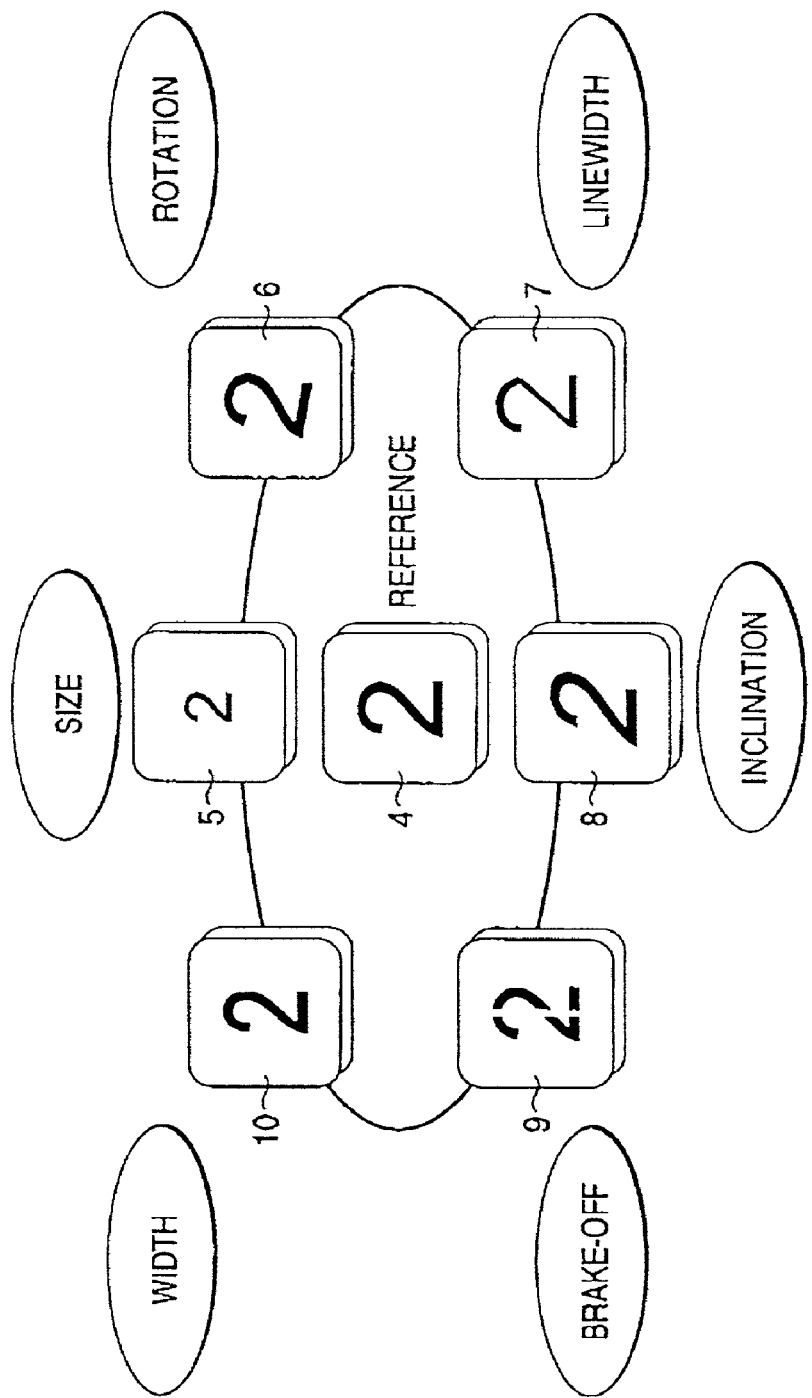
FIG. 5 is a figure showing a reference character and characters to be actually read out.
Figure 6:
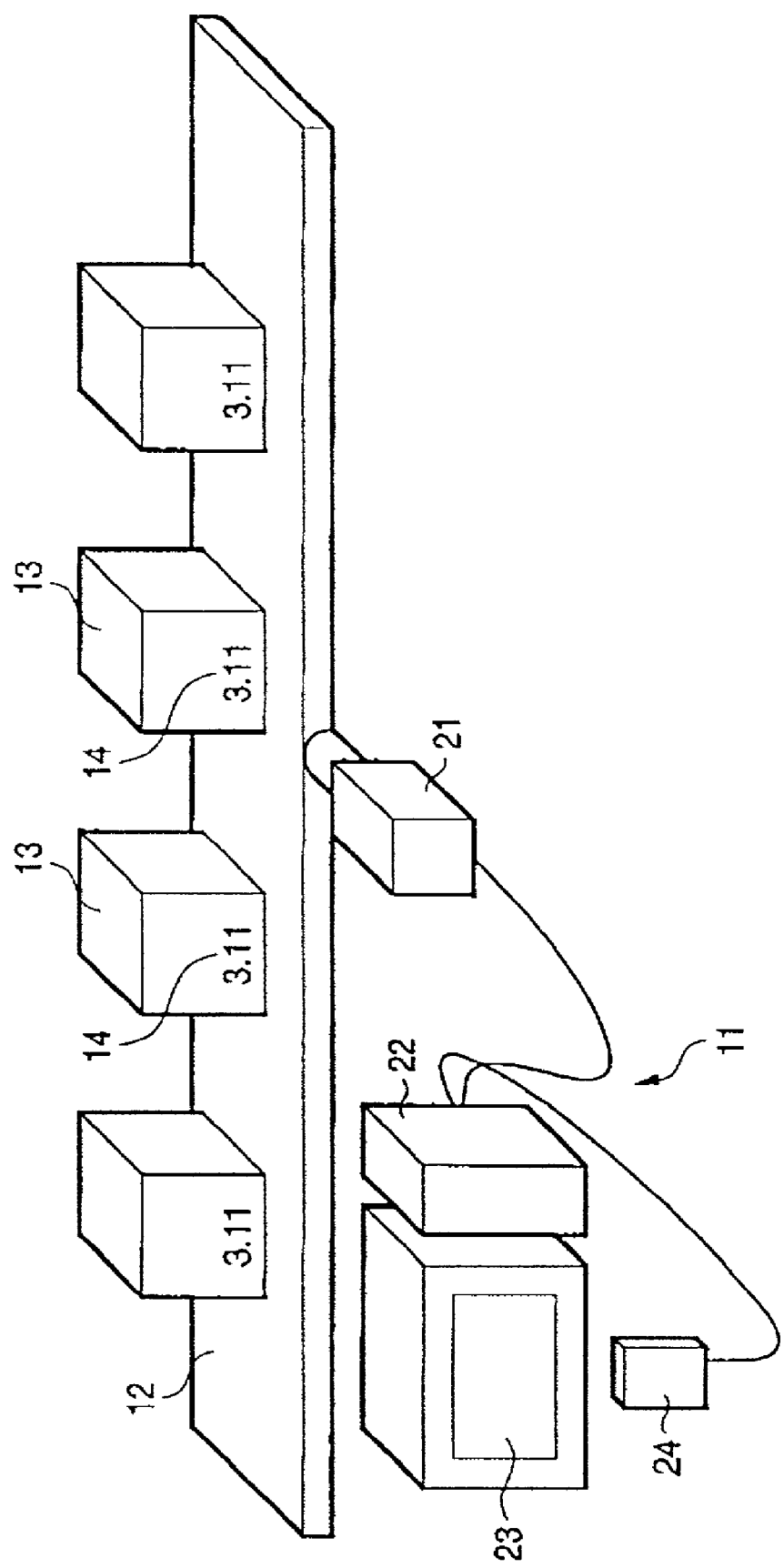
FIG. 6 is a perspective view of an image examining apparatus according to one embodiment of the present invention.
Figure 7:
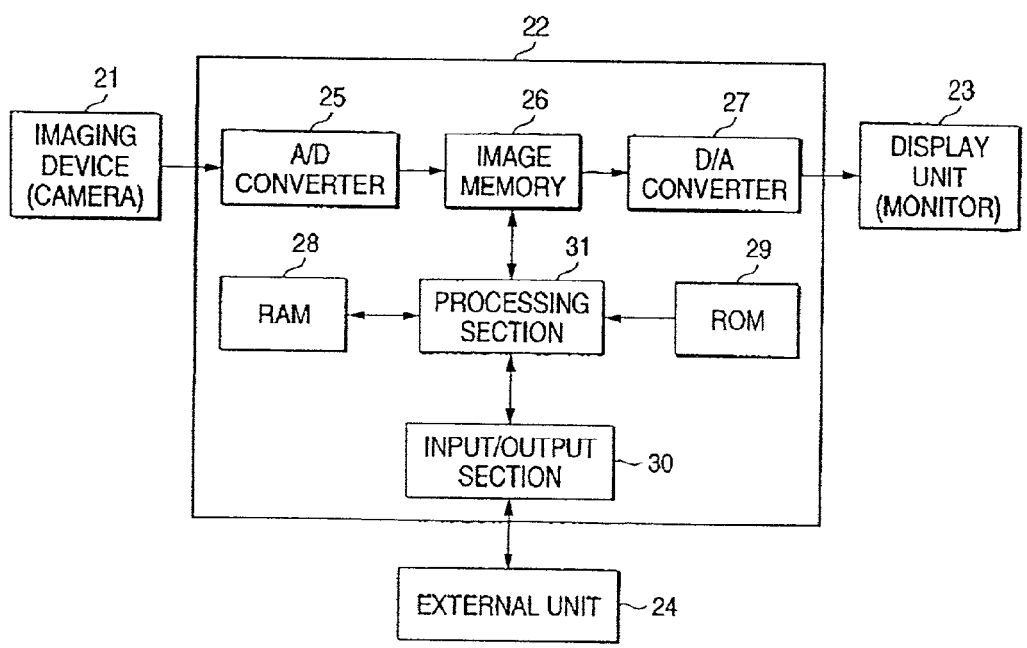
FIG. 7 is a block diagram showing a configuration of the same image examining apparatus.

FIG. 6 is a perspective view of an image examining apparatus 11 according one embodiment of the present invention while FIG. 7 is a block diagram showing a configuration of the image examining apparatus 11. FIG. 6 shows a state of examining a character 14 printed using a printer, such as a laser marker or ink jet printer, on a product 13 being moved over a conveyor 12 in a factory product line or the like. Herein, character examination is meant to determine quality goodness/poorness of a printed character, symbol, mark or the like, i.e. to collate on whether the printed character is correct and make certain of whether the printed character is clear or not.

The image examining apparatus 11 is configured, as shown in FIGS. 6 and 7, with an imaging device (CCD camera) 21, a processing unit 22, a display unit (monitor) 23 and an external unit 24. The processing unit 22 comprises an A/D (analog/digital) converter 25, an image memory 26, a D/A (digital/analog) converter 27, a RAM 28, a ROM 29, an input/output section 30 and a processing section 31.

The imaging device 21 is arranged directed toward a product 13 as a subject of examination, to take an image of a character 14 of a product 13 moving on the conveyor 12 and output an image thereof (examination image) as an image signal (analog signal). The A/D converter 25 within the processing unit 22 converts the examination image outputted from the imaging device 21 into character image data (digital signal) and stores it to the image memory 26.

The external unit 24 is an input unit, such as a keyboard or console. From the external unit, inputted are the examination-purpose information comprising characters, symbols, marks or the like (not character image or the like) and a determining value as an evaluation reference in goodness/poorness-determination of an examination image. The examination-purpose information and determining value inputted from the external unit 24 is outputted as an electric signal from the external unit 24. The input/output section 30, an interface for receiving the information outputted from the external unit, converts the code of the character, symbol or mark (hereinafter, referred to as registration character code) or determining value into a predetermined signal and forwards it to the processing section 31.

The processing section 31, configured by a microprocessor, such as a CPU or MPU, executes a predetermined process according to an operation program stored in the ROM 29 thus controlling the image memory 26, the RAM 28 and the input/output section 30. For example, the processing section 31 registers the registration character code or determining value sent from the input/output section 30 to the RAM 28. This also retrieves, as hereinafter referred, a character similar to the examination image and calculates a similarity degree to sort the retrieved characters (character codes) in the order of higher similarity degree. Then, the top-ranking character is compared with a registration character code, to determine as to whether the examination image is good or not-good.

The ROM 26 is stored with an operation program for executing the processing section 31 and a reference-character database (a set of standard fonts, etc.) including character images in predetermined kinds and character codes thereof.

The display unit 23 is outputted by a signal converted from a digital signal to an analog signal by the D/A converter 27. This displays information, as required, of an examination image captured through the imaging device 21 and stored in the image memory 26, a result of good/not-good determination on an examination image, or the like.

Figure 8:
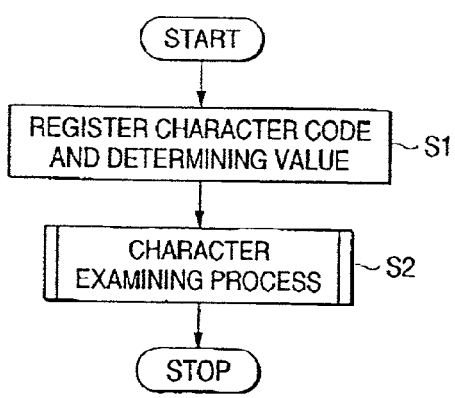
FIG. 8 is a flowchart representing a process procedure for examining a character image by the same image examining apparatus.
Figure 9:
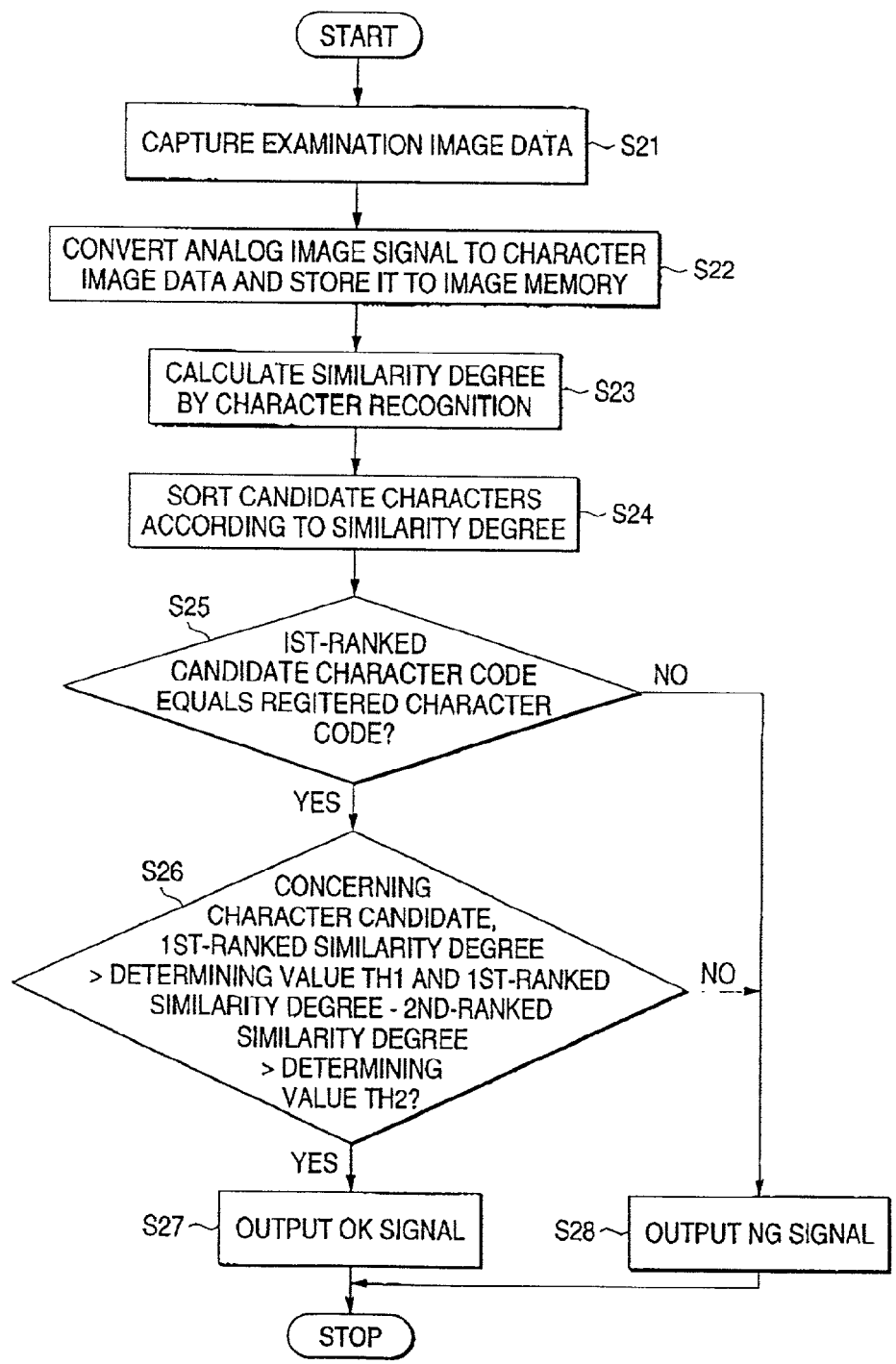
FIG. 9 is a flowchart explaining in detail the steps of a character examining process.

FIG. 8 is a flowchart explaining the procedure outline of an examination method by the image examining apparatus 11. FIG. 9 is a flowchart showing the detail of character examination process steps of FIG. 8. In the preparation for carrying out an examination by the image examining apparatus 11, a character as an object of examination (including a symbol, mark or the like) and two determining values for evaluating good/not-good determination are inputted through the external unit 24, such as a keyboard, to previously register a registration character code and the determining values to the RAM 28 within the processing unit 22 (step S1). Note that, where the character as an object of examination is a serial number (consecutive number), an initial value only is satisfactorily registered.

Then, starting a character examining process on a product 13 under transportation by the conveyor 12 (step S2), the character 14 on the product 13 as an object of examination is image-captured by the imaging device 21 (step 21). The A/D converter 25 converts an analog image signal into character image data (digital signal). This is stored as an examination image to the image memory 26 (step S22).

Storing the examination image to the image memory 26, the processing section 31 carries out character recognition on the examination image according to the operation program stored in the ROM 26, to take characters, one by one, out of the examination image. Then, the processing section 31 retrieves the reference-character database previously stored in the ROM 29 to pick up a relevant character candidate (character code) and, at the same time, calculates a similarity degree thereof (step S23). The character candidates are sorted in the order of higher similarity degree (e.g. down to third ranking) (step S24).

Figure 10:
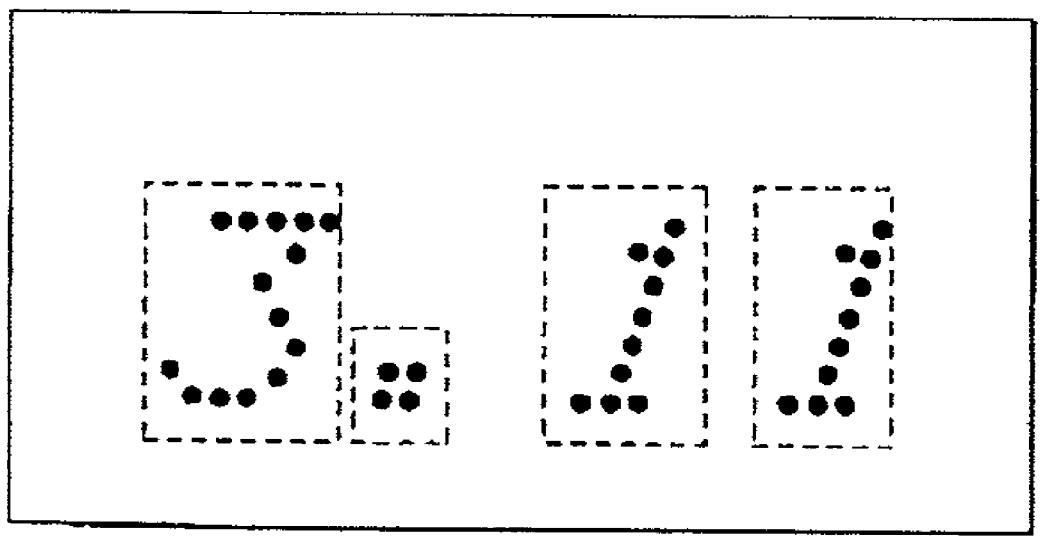
FIG. 10 is a figure showing a manner cutting individual character images from the examination image.

Assuming, for example, that the examination image captured through the imaging device 21 is a character "3.11" as shown in FIG. 10, this is separated character by character, e.g. "3", ".", "1" and "1", and taken therefrom. Then, a character candidate for "3" is retrieved throughout the reference-character database. As shown in FIG. 11A, similar characters, e.g. "3", "B" and "8", are listed and sorted in the order of similarity degree. Similarly, character candidate for "." is retrieved to list and sort similar characters, e.g. ".", ",", and "'", in the order of similarity degree as shown in FIG. 11B. Furthermore, character candidates for "1" are retrieved to list and sort similar characters, e.g. "1", "I" and "/", in the order of similarity degree as shown in FIG. 11C (third character "1") or FIG. 11D (fourth character "1"). Note that, in FIGS. 11A–11D, similarity is normalized to the full marks of 100 points for easy understanding. The result of retrieval may be displayed on the display unit (monitor) 23.

Then, the processing section 31 arranges the first-ranked candidates for the characters into a character string having first-ranked candidates as shown in FIG. 12B, and considers it as a character string of the examination image. Meanwhile, read out is a registration character code (registered character string) having been inputted from the external unit 24 and stored in the RAM 28. In a character string extracted from the examination image, the first-ranked candidate character code for the first character is compared with a registration character code for the first character, as shown in FIGS. 12B and 12C, to collate whether they are coincident with each other. Similarly, the character code of the first ranking among the character candidates for the n-th (n=2, 3, . . . ) character extracted from the examination image, is compared and collated with a registration character code of the n-th character (step S25). In this manner, collation is made for all the character strings extracted from the examination image in between the character code of the first-ranked candidate extracted from the examination image and the registration character code thereof. As a result, in the case that there exists any character not coincident in the character code, the examination image is determined not good (NG) to output an NG signal (step S28).

On the contrary, where there is perfect coincidence between the character code of the first-ranked candidate extracted from the examination image and the registration character code thereof, each character candidate is deter mined as to whether or not satisfying the followings (step S26):

similarity degree in the first-ranked candidate character>determining value TH1 (1)

similarity degree in the first-ranked candidate−similarity degree in the second-ranked candidate>determining value TH2 (2).

If any character candidate does not satisfy at least one of Formulas (1) and (2), the examination image is determined not good (NG) to output an NG signal (step S28). Meanwhile, if all the character candidates satisfy the both of Formulas (1) and (2), the examination image is determined favorable to output an OK signal (step S27).

For example, assuming the determining value H1=80 and the determining value TH2=20 (both normalized to 100), in FIGS. 11A–11D any of the character candidates satisfies the both of Formulas (1) and (2). Consequently, the examination image of FIG. 10 is determined good.

The NG or OK signal is converted by the D/A (digital/analog) converter 27 into an analog signal and forwarded to the display unit, such as a monitor. The good/not-good determination result of the examination image is displayed on the display unit 23. Meanwhile, where an NG signal is outputted, the NG signal is outputted also to the external unit 24 through the input/output section 30. The external unit 24 issues a caution on a lamp or through a speaker. In some cases, the line is shut down or the product 13 determined not good is removed from the conveyor 12 or so by a closing machine or the like. In the case of outputting an OK signal, the process is continued.

In this manner, the image examining apparatus 11, using the character recognition technique, eliminates the necessity of the conventionally required operation that the user inputs the image for registration character through the imaging device. Thus, registration is easy by inputting registration characters (character codes) through the external unit 24, such as a keyboard.

Figures 13, 14:
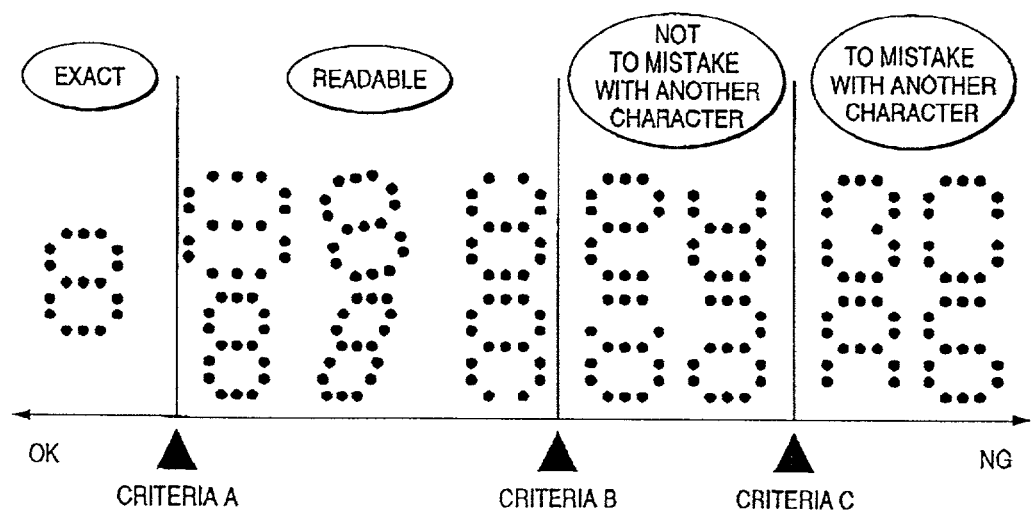
FIG. 13 is a figure explaining the manner correlating the same characters different in font or the like in an comparative example.
FIG. 14 is a figure arranging the examination images in various quality of from an exact examination image to an examination image to be mistaken with another character.

Meanwhile, with the image examining apparatus 11 using the character recognition technique, an examination image even if different in font or character shape from the registration character code image can be determined on whether the examination image is good or not. Incidentally, with an image examining apparatus alike the prior art, the same characters different in font or character shape as shown in FIG. 13 if previously correlated makes it possible to determine even an examination image different in font type or shape from the registration character code image as to whether the examination image is good or not. However, this requires the operation that, for every character, the characters different in font or character shape are inputted through the imaging device to correlate one to another the same characters. The determination process thereof is extremely complicated. Contrary to this, it is satisfactory for the image examining apparatus 11 of the invention using character recognition to store a character image as a reference in one kind. This makes simple the structure and determination processing process.

Meanwhile, in the method of comparing the similarity degree of a candidate character with the determining values TH1, Th2 by using the Formulas (1) and (2), the determination criteria can be made flexible and approximated nearing the determination criteria of the human by how to set the determination values TH1, TH2. For example, FIG. 14 is an example of various examination images of numeral "8" wherein arranged, in the order from the left, are an exact examination image, a readable (illegible) examination image, an examination image not to be mistaken with another character (no fear to misread with another character), and an examination image to be mistaken with another character (having a fear to misread with another character). Meanwhile, the criteria A shown in FIG. 14 is to determine the exact examination image as good (OK) but the readable examination image and the worse as not good (NG). The criteria B is to render the readable examination image and the better as good (OK) but the examination image no to be mistaken with another character and the worse as not good (NG). The criteria C is to render the examination image not to be mistaken with other characters and the better as good (OK) but the examination image to be mistaken with another character and the worse as not good (NG). In order to realize the criteria A, it is satisfactory to make the determining value TH1 great and the determining value TH2 comparatively great, as shown in FIG. 15. In order to realize the criteria B, it is satisfactory to make the determining value TH1 comparatively small and the determining value TH2 comparatively great. In order to realize the criteria C, it is satisfactory to make the determining value TH1 comparatively small and the determining value TH2 small.

For example, it is assumed that the respective determining values TH1, TH2 of the references A, B and C are defined as the values in FIG. 15 to perform good/not-good determination on the various examination images concerning the numeral "8". At first, assumption is made on the case, in the criteria A, with a determining value TH1=90 and a determining value TH2=20. Now, provided that, in an exact examination image, the first-ranked character candidate "8" has a similarity degree of 98 and the second-ranked character candidate "B" has a similarity degree of 55 as shown in FIG. 16A, we obtain that first-ranked character candidate similarity degree (98)>determining value TH1 (90) thus holding the Formula (1), and first-ranked similarity degree (98)–second-ranked similarity degree (55)>determining value TH2 (20) thus holding the Formula (2).

Accordingly, the output is provided good (OK). On the contrary, in the readable examination image, because the first-ranked character candidate "8" has a similarity degree of 85 and the second-ranked character candidate "B" has a similarity degree of 55 as shown in FIG. 16B, we obtain that first-ranked character candidate similarity degree (85)<determining value TH1 (90) thus not holding the Formula (1), and further first-ranked similarity degree (85)–second-ranked similarity degree (55)>determining value TH2 (20) thus holding the Formula (2). Accordingly, the output is provided not good (NG). In the examination image not to be mistaken with another character, because the first-ranked character candidate "8" has a similarity degree of 72 and the second-ranked character candidate "B" has a similarity degree of 55 as shown in FIG. 16C, we obtain that first-ranked character candidate similarity degree (72)<determining value TH1 (90) thus not holding the Formula (1), and first-ranked similarity degree (72)–second-ranked similarity degree (55)<determining value TH2 (20) thus not holding also the Formula (2). Accordingly, the output is provided not good (NG). In the examination image to mistake with another character, provided that the first-ranked character candidate "8" has a similarity degree of 85 and the second-ranked character candidate "3" has a similarity degree of 80 as shown in FIG. 16D, we obtain that first-ranked character candidate similarity degree (85)<determining value TH1 (90) thus not holding the Formula (1), and first-ranked similarity degree (85)–second-ranked similarity degree (80)<determining value TH2 (20) thus not holding the Formula (2). Accordingly, the output is provided not good (NG). Therefore, with the criteria A, the exact examination image only is determined good (OK).

Next, consideration is made on a case, in criteria B, with a determining value TH1=70 and a determining value TH2=20. In the exact examination image, because the first-ranked character candidate "8" has a similarity degree of 98 and the second-ranked character candidate "B" has a similarity degree of 55 as shown in FIG. 17A, we obtain that first-ranked character candidate similarity degree (98)>determining value TH1 (70) thus holding the Formula (1), and first-ranked similarity degree (98)–second-ranked similarity degree (55)>determining value TH2 (20) thus holding the Formula (2). Accordingly, the output is provided good (OK). Meanwhile, in the readable examination image, because the first-ranked character candidate "8" has a similarity degree of 85 and the second-ranked character candidate "B" has a similarity degree of 55 as shown in FIG. 17B, we obtain that first-ranked character candidate similarity degree (85)>determining value TH1 (70) thus holding the Formula (1), and first-ranked similarity degree (85)–second-ranked similarity degree (55)>determining value TH2 (20) thus holding also Formula (2). Accordingly, the output is provided good (NG). On the contrary, in the examination image not to be mistaken with another character, because the first-ranked character candidate "8" has a similarity degree of 72 and the second-ranked character candidate "B" has a similarity degree of 55 as shown in FIG. 17C, we obtain that first-ranked character candidate similarity degree (72)>determining value TH1 (70) thus holding the Formula (1), and first-ranked similarity degree (72)–second-ranked similarity degree (55)<determining value TH2 (20) thus not holding the Formula (2). Accordingly, the output is provided not good (NG). In the examination image to be mistaken with another character, because the first-ranked character candidate "8" has a similarity degree of 85 and the second-ranked character candidate "3" has a similarity degree of 80 as shown in FIG. 17D, we obtain that first-ranked character candidate similarity degree (85)>determining value TH1 (70) thus holding the Formula (1), but first-ranked similarity degree (85)–second-ranked similarity degree (80)<determining value TH2 (20) thus not holding the Formula (2). Accordingly, the output is provided not good (NG). Consequently, with the criteria B, the readable examination image and the better are determined good (OK) but the examination image to be mistaken with another character and the worse are etermined not good (NG).

Next, consideration is made on a case, in criteria C, with a determining value TH1=70 and a determining value TH2=10. In the exact examination image, because the first-ranked character candidate "8" has a similarity degree of 98 and the second-ranked character candidate "B" has a similarity degree of 55 as shown in FIG. 18A, we obtain that first-ranked character candidate similarity degree (98)>determining value TH1 (70) thus holding the Formula (1), and first-ranked similarity degree (98)–second-ranked similarity degree (55)>determining value TH2 (10) thus holding the Formula (2). The output is provided good (OK). Meanwhile, in the readable examination image, because the first-ranked character candidate "8" has a similarity degree of 85 and the second-ranked character candidate "B" has a similarity degree of 55 as shown in FIG. 18B, we obtain that first-ranked character candidate similarity degree (85)>determining value TH1 (70) thus holding the Formula (1), and first-ranked similarity degree (85)–second-ranked similarity degree (55)>determining value TH2 (10) thus holding also the Formula (2). The output is provided good (OK). Meanwhile, in the examination image not to be mistaken with another character, because the first-ranked character candidate "8" has a similarity degree of 72 and the second-ranked character candidate "B" has a similarity degree of 55 as shown in FIG. 18C, we obtain that first-ranked character candidate similarity degree (72)>determining value TH1 (70) thus holding the Formula (1), and first-ranked similarity degree (72)–second-ranked similarity degree (55)>determining value TH2 (10) thus holding the Formula (2). The output is provided good (OK). On the contrary, in the examination image to be mistaken with another character, because the first-ranked character candidate "8" has a similarity degree of 85 and the second-ranked character candidate "3" has a similarity degree of 80 as shown in FIG. 18D, we obtain that first-ranked character candidate similarity degree (85)>determining value TH1 (70) thus holding the Formula (1), but first-ranked similarity degree (85)–second-ranked similarity degree (80)<determining value TH2 (10) thus not holding the Formula (2). The output is provided not good (NG). Consequently, with the criteria C, the examination image not to be mistaken with another character and the better are determined good (OK) but the examination image to be mistaken with another character and the worse are determined not good (NG).

Figure 19:
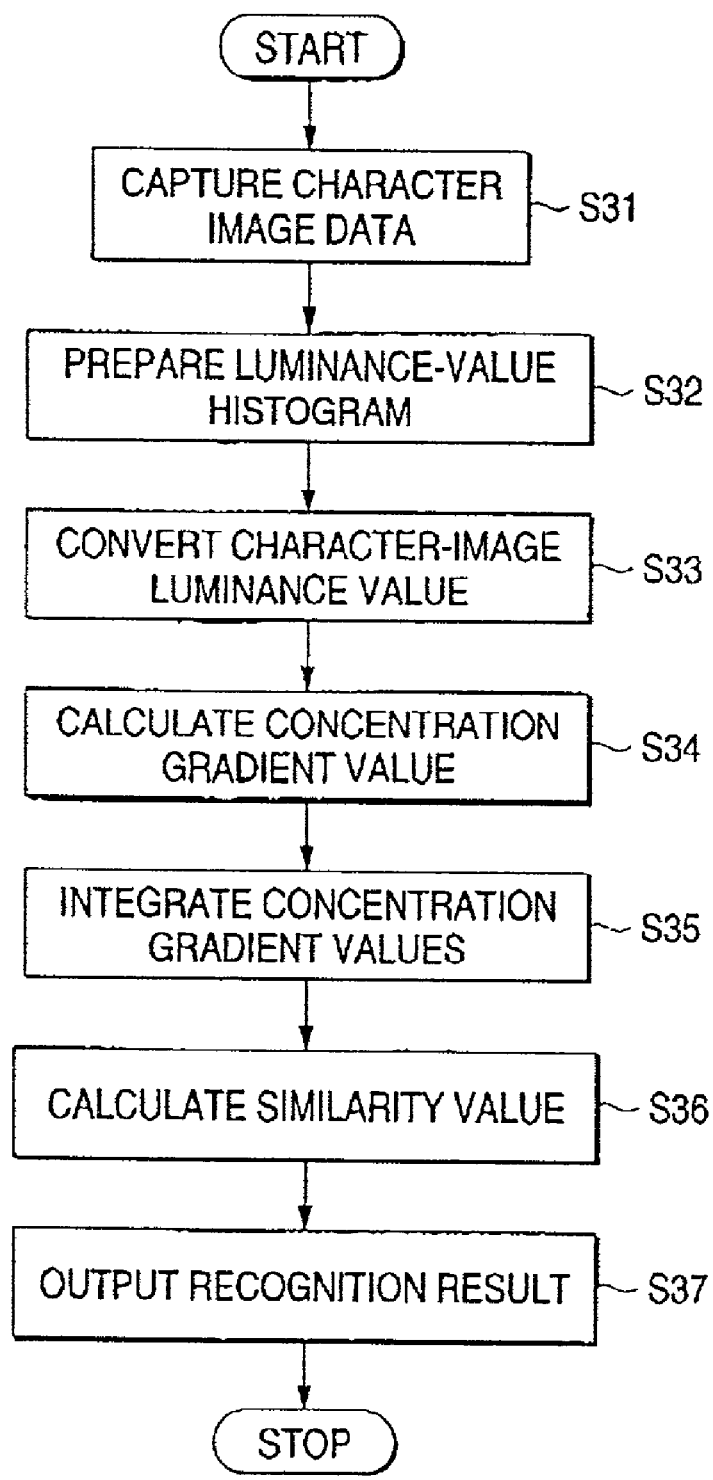
FIG. 19 is a flowchart showing a process procedure of character recognition.

Although there is no especial limitation in the method for retrieving a character candidate similar to the examination image by the processing section 31 to calculate a similarity degree thereof (step S23 in FIG. 9), this can be carried out, for example, by the following detailed description for example. FIG. 19 is a flowchart showing the process of up to similarity-degree calculation and character recognition in the processing section 31. The processing section 31 carries out, according to the operation program stored in the ROM 29, preparation of a luminance-value histogram against the character image data stored in the image memory 26, conversion of the luminance value, calculation of a luminance-value concentration gradient value, integration of concentration gradient values based on predetermined pixels, calculation of a similarity degree to the data stored in ROM 29 representative of a character image and character recognition. The interim data to be used for the processing in each stage in the image examining apparatus 11 is properly stored to the RAM 14.

The processes in FIG. 19 will be described in detail below. The examination image caught by the imaging device 21 is stored to the image memory as described before and thereafter further taken in the processing section 31 (step S31).

The character image data is subjected to a character-size normalizing process in the processing section 31. FIG. 20 shows one example of an examination image obtained by shooting. In FIG. 20, the area surrounded by a small quadrilateral represents a pixel, wherein a luminance value on each pixel is shown by a tone in 256 levels of from 0 to 255.

Subsequently, a luminance histogram is prepared based on a luminance value of each pixel from the character image data obtained by shooting (step S32). FIG. 21 shows an example of a luminance-value histogram. In the luminance-value histogram shown in FIG. 21, an appearance frequency of ±5 luminance value about a particular luminance value is represented as a luminance-value appearance frequency. For example, a luminance value of 6–15 is given as an appearance frequency for a luminance value 10, and a luminance value of 16–25 is as an appearance frequency for a luminance value 20. Nevertheless, because the luminance values are in 256 tonal levels of 0–255, the appearance frequency for a luminance value 0 is represented by the appearance frequency for a luminance value 0–5 and there exists no appearance frequency for a luminance value 260.

After preparing a luminance-value histogram, a conversion process is made on the luminance value (step S33). The luminance-value conversion process is due to the necessity to normalize the luminance value because of difference in luminance between character images caused by illumination intensity to the character, reflectivity of a character and background thereof, optical restriction and so on where inputting an image from a photoelectric converting device, such as a CCD, and to reduce the affection of noise, deviation between the pixel elements of the CCD, and lack of information at lower than a limitation frequency shown by a sampling theorem.

The luminance value converting process is carried out by determining a low luminance noise range and high luminance noise range from the luminance value histogram and converting the luminance value of each pixel to be fallen within an intermediate luminance range excluding the determined noise range. The luminance value converting process in the processing section 31 is made on the basis of a graph defined by first and second luminance values, wherein the luminance value smaller than a first luminance value having an appearance frequency of 5% of all the pixels as taken from a lower luminance value is given 0 while a second luminance value greater than a luminance value having an appearance frequency of 5% of all the pixels as taken from a higher luminance value is given 255.

Figures 22, 23:
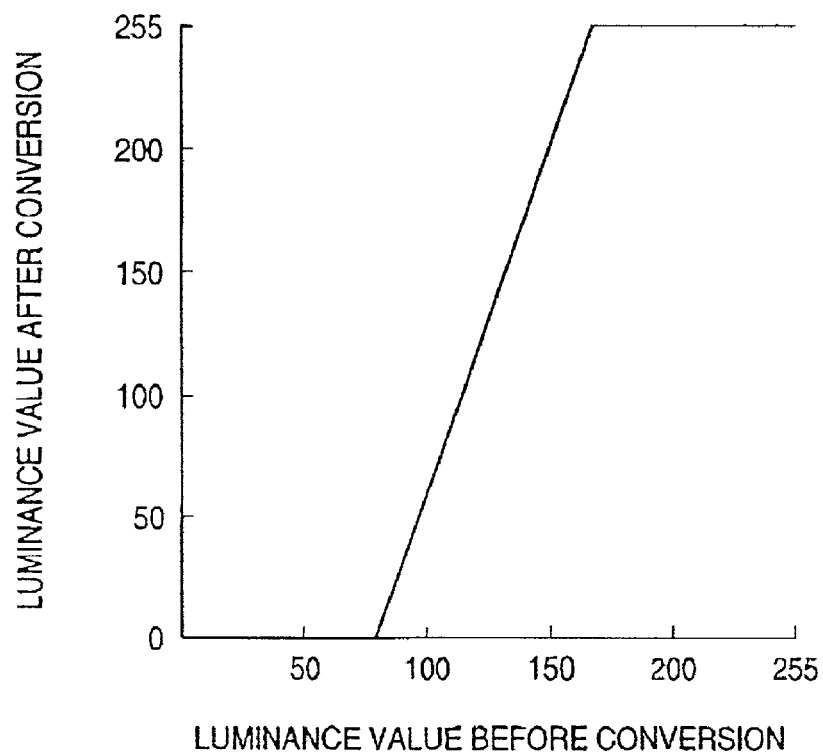
FIG. 22 is a figure representing a graph of luminance value conversion.
FIG. 23 is a figure showing a relationship between a luminance value of before luminance-value conversion and a luminance value of after luminance-value conversion.

FIG. 22 shows a graph for luminance value conversion while FIG. 23 shows a relational formula of luminance value conversion.

In this embodiment, because the character image contains 14 (pixels)×14 (pixels)=196 (pixels), 5% of all the pixels provides 9.8. Accordingly, from the luminance value histogram the first luminance value is given 80 and the second luminance value is 170, wherein the luminance value of equal to or smaller than the first luminance value 80 is 0 and the luminance value of equal to or greater than the second luminance value is 255. Meanwhile, the luminance value at between the first luminance value 80 and the second luminance value 170 is expressed by Formula (3) wherein the luminance conversion is made using a straight line defined by the two points of a luminance value 0 at the first luminance value of 80 and a luminance value 255 at a second luminance value of 170. In Formula (3), Y is a luminance value of after luminance conversion and X is a luminance value of before luminance conversion.

[Formula 1]

$$Y = \{255/(170-80)\}X - \{80 \times 255/(170-80)\} \quad (3)$$
$$= (255/90)X - (2040/9)$$

FIG. 24 shows an image of after luminance conversion. In the luminance conversion, rounding is made in the first decimal place to provide an integer.

Subsequently, a concentration gradient value calculating process is made on the luminance value (step S34).

The concentration gradient value calculating process, in this embodiment, utilizes a Robinson's edge detecting operator. The Robinson's edge detecting operator is shown in FIGS. 25A–25H. The Robinson's edge detecting operator is configured with masks A–H in eight kinds. In FIG. 25, A and E, B and F, C and G, and D and H are to calculate concentration gradients different by 180 degrees. However, the character is basically configured with lines, and satisfactorily considered the same in character feature even if the concentration gradients are different by 180 degrees. Accordingly, the four Robinson's edge detecting operators of FIGS. 25A–25D will be used in this embodiment.

FIG. 26A shows a part of an image of after luminance value conversion while FIG. 26B shows a generalized Robinson's operator.

The concentration gradient value for pixel luminance value is obtained by summing up the multiplication values of the luminance values of the pixel for determining concentration gradient value and the surrounding pixels by the Robinson's operators in the corresponding positions. For example, the concentration gradient value on a pixel $a_s$ for a luminance-converted image is expressed by Formula (4).

[Formula 2]

$$d_5 = \sum_{u=1}^{9} a_u \times m_u \quad (4)$$
$$= a_1 \times m_1 + a_2 \times m_2 + \ldots + a_9 \times m_9$$

After completing the concentration gradient value calculating process, a concentration gradient value integrating process is carried out (step S35).

The concentration gradient value integrating process is performed by averaging the concentration gradient values and applying a Gaussian distribution mask onto the averaged concentration gradient value.

FIG. 27A shows a part of an image, wherein concentration gradient values are denoted at $d_1$–$d_8$. Meanwhile, FIG. 27B shows a part of an image of after the process of averaging the concentration gradient values, wherein the averaged concentration gradient values are denoted at $D_1$ and $D_2$.

The averaging process on concentration gradient values is carried out by arithmetically averaging the concentration gradient values on the mutually adjacent four pixels configuring the quadrilateral. For example, an averaged concentration gradient value $D_1$ is obtained by $D_1=(d_1+d_2+d_3+d_4)/4$ while $D_2$ is by $D2=(d_5+d_6+d_7+d_8)/4$.

The averaging process integrates the concentration gradient values on the pixels having a size of vertically 14 by horizontally 14 into a size of vertically 7 by horizontally 7.

FIG. 28 shows an example of a Gaussian distribution mask. Meanwhile, FIG. 29 shows, by black circles, the positions where the Gaussian distribution masks are to be placed.

When the Gaussian distribution mask at its center (0.11) is placed in a position of a black circle shown in FIG. 29, multiplication is made between a Gaussian distribution mask position and an averaged concentration gradient value existing in the corresponding position similarly to the case of applying the Robinson's edge detecting parameter, thus obtaining a sum thereof. This further integrates the concentration gradient values having a size of vertically seven by horizontally seven into the data of 16 in the number having a size of vertically four by horizontally four.

Because the Robinson's edge detecting operators shown in FIG. 25 includes four kinds, a set of concentration gradient values integrated in the number of the edge-detecting operators, i.e. 16×4=64.

Figures 30, 31:
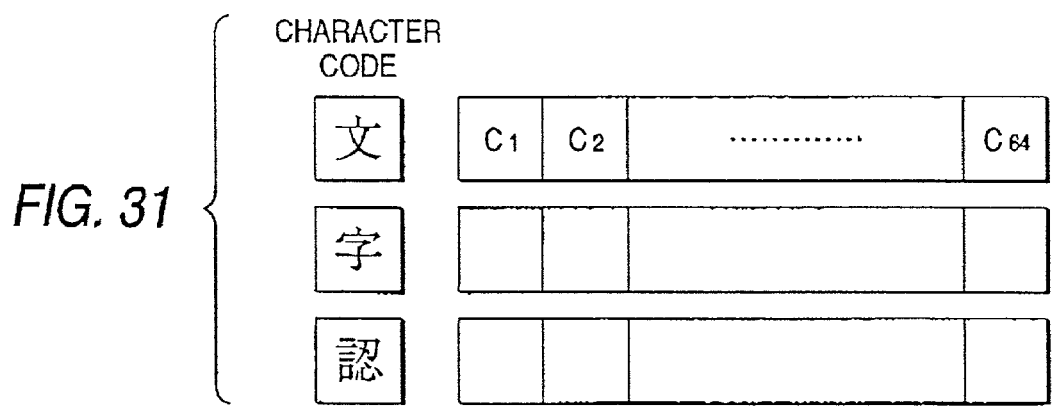
FIG. 30 is a figure showing the data of integrated concentration gradient values.
FIG. 31 is a figure showing the data of concentration gradient value previously stored.

The data of 64 in the number will be denoted using $b_1$–$b_{64}$ as shown in FIG. 30.

On the other hand, the ROM 29 is stored with a set of concentration gradient values of 64 in the number for each predetermined region obtained through the luminance-value concentration gradient value calculation integration and integration as above, for each character image of a plurality of kinds of reference character database, e.g. $c_1$–$c_{64}$.

Calculated is a similarity degree of between a set of the data $b_1$–$b_{64}$ in the number of 64 integrated and obtained in the processing section 31 and a set of data based on character kind stored in the ROM 29 (step S36). The similarity degree in this embodiment is calculated by using Euclidean distance calculation. The similarity degree if given S is expressed by Formula (5).

[Formula 3]

$$S = \sqrt{\sum_{i=1}^{64} b_i c_i} \quad (5)$$

Three characters, for example, greater in the similarity value S obtained from the Euclidean distance calculation (smaller in Euclidean distance) are recognized and outputted as character candidates for the examination image shot by the imaging device 21 (step S37). Then, the outputted characters are sorted in the order of greater similarity value as described before (step S24 in FIG. 9).

(Second Embodiment)

Figure 32:
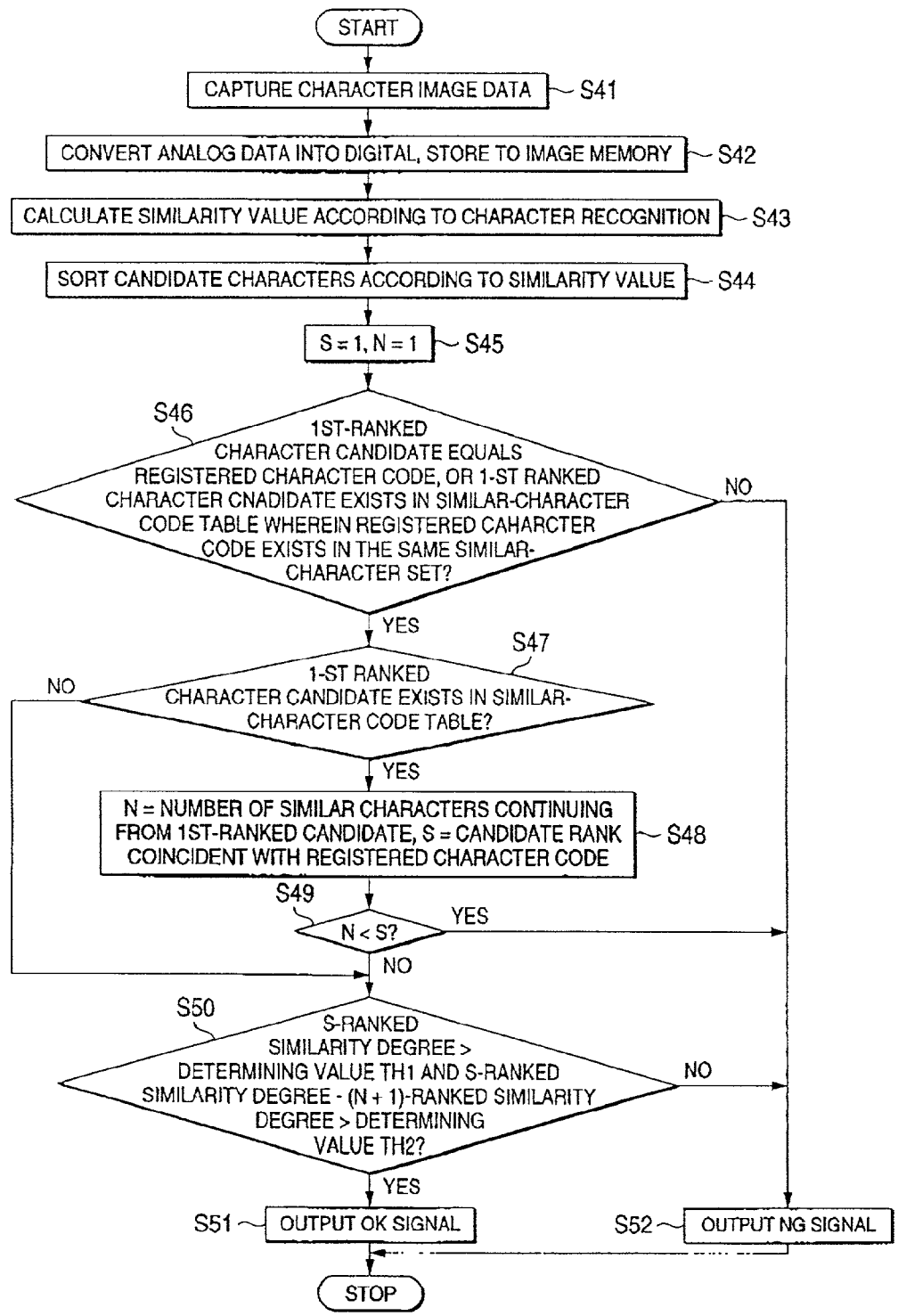
FIG. 32 is a flowchart showing a process procedure for good/not-good determination of an examination image in an image examining apparatus according to another embodiment of the invention.

FIG. 32 is a flowchart showing a process procedure for good/not-good determination of an examination image in an image examining apparatus according to another embodiment of the invention. Meanwhile, FIG. 33 represents a similar-character code table previously stored in the ROM 29. This similar-character code table is registered with, as the same set having the characters looking like and difficult to distinguish one another, e.g. "0" (numeric zero), "O" (alphabetical capital letter O) and "o" (alphabetical lower case o), or "1" (numeric one), "l" (alphabetical lower case l) and "I" (alphabetical capital letter I). Meanwhile, FIG. 34 exemplifies a result of sort of candidate characters for an examination image "1". The candidate ranking in such a sort result is represented by S. Meanwhile, the number of continuing characters that the characters in the same set as a first-ranked character within the similar-character code table continues, in a sort result, from the first-ranked character (hereinafter, referred to as the number of continuing similar characters) is represented by N. For example, in the FIG. 34 case, the first-ranked (S=1) character is "l" (lower case l) and the second-ranked (S=2) character "1" (numeric one) is in the same set as the first-ranked "1" (1) in the similar-character code table of FIG. 33. The third-ranked (S=3) character "7" (numeric seven) is not in the same set as the first-ranked "l" in the similar-character code table of FIG. 33. Accordingly, in the sort result of FIG. 34, the number of continuing similar characters is given N=2.

This embodiment will be explained in accordance with the flowchart of FIG. 32. Because the steps S41–S44 in the flowchart of this embodiment are the same as the steps S21–S22 of FIG. 9, the steps S41–S44 are omittedly explained to begin explanation at step S45. When the candidate characters for an examination image are sorted in the order of higher similarity degree, the candidate-ranking variable S is first set to an initial value 1 and the variable N for the number of continuing similar characters is also set to an initial value 1 (step S45).

Then, determination is made as to whether the first-ranked character candidate equals to a registration character code or whether the first-ranked character candidate exists in the similar-character code table and there is a registration character code within the same set (step S46). Specifically, the first-ranked character candidate, in a result of sort according to similarity degree as in FIG. 34, is compared with a registration character code, to determine whether the first-ranked character candidate equals the registration character code. As a result of the determination, if the first-ranked character candidate equals the registration character code, the determination result in step S46 is rendered YES. If the first-ranked character code is not equal to the registration character code, retrieval is made whether a character code of the first ranking is registered in the similar-character code table. If there is a registration, it is examined whether the registration character code exists within the same set as the similar set. If the registration character code exists within the same set, the determination result of step S46 is rendered YES. For example, in the case of FIG. 34, the registration character code is "1" (numeric one) and the first-ranked character candidate is "l" (lower case l), resulting in not coincidence with each other. Consequently, retrieval is made for a similar set registered with "l" (lower case l) of the similar-character code table. Searching for "1" (numeric one) of the registration character code, a registration character code is found within the same set, hence rendering YES the determination result of step S46.

In the other cases than the above, namely, where the first-ranked character candidate is not equal to the registration character code and no registration character code is found within the same set as the first-ranked character candidate of the similar character code table, the determination result in step S46 is NO. Thus, the examination image is determined not good to output an NG signal (step S52).

Meanwhile, where YES is determined in step S46, determination is made whether it is in the case the first-ranked character is not coincident with a registration character code and in the case the first-ranked character exists in the similar-character code table (step S47). If existing in the similar-character code table, collation is made between the similar-character code table and the sort result to examine the number of continuing similar characters, thereby substituting the value of the number of continuing similar characters to the variable N. Also, the ranking of a candidate coincident with the registration character code is substituted to the variable S (step S48). Then, the variable N and the variable S are compared (step S49). If N<S, the registration character code and the first-ranked character are not the characters within the same set, and hence the examination image is determined not good to output an NG signal (step S52). For example, in the sort result of FIG. 35, because the number of continuing similar characters N=2 and the ranking of the character code coincident with the registration character code is S=4, it is determined that there is no similarity between the first-ranked character candidate and the fourth-ranked character candidate (registration character code). Thus, the determination of step S49 is YES.

On the other hand, if N≧S, the registration character code and the first-ranked character are the characters within the same set, and hence the process proceeds to the next step S50. For example, in the sort result of FIG. 34, because the number of continuing similar characters is N=2 and the character code coincident with the registration character code is in a ranking of S=2, it is determined that there is kept similarity between the first-ranked character candidate and the second-ranked character candidate (registration character code). Accordingly, No is determined in step S49 and the process proceeds to the next step S50.

Meanwhile, in step S47, where the first-ranked candidate character is not found in the similar-character code table or where the first-ranked character coincides with a registration character code, the variable N and the variable S remain 1 to jump to step 50.

In step S50, comparison is made between a similarity degree of an S-ranked candidate character coincident with a registration character code (referred to as S-ranked similarity degree) and the determining value TH1. Also, comparison is made with the determining value TH2 a difference between the similarity degree of the S-ranked candidate character and the similarity degree of an (N+1)-ranked candidate character [i.e. the highest-ranked character among the candidate characters not within the same set as the first-ranked candidate character] (referred to as (N+1)-ranked similarity degree). If $$\text{S-ranked similarity degree} > \text{determining value TH1} \qquad (6)$$

and $$\text{S-ranked similarity degree} - (N+1)\text{-ranked similarity degree} > \text{determining value TH2} \qquad (7),$$

YES is determined in step 50, to output an OK signal because of a good examination image (step S51).

On the contrary, where any of Formulas (6) and (7) is not satisfied, the examination image is not good to output an NG signal (step S52).

In this manner, the present embodiment uses the similar-character code table to correlate between the characters difficult in determination. Accordingly, even where there exists a similar character difficult in correct character recognition, it is possible to reduce the possibility of erroneous determination and improve the accuracy in good/not-good determination of an examination image.

According to the image examining apparatus of the present invention, determination is made as to image good/not-good image by utilizing an image-recognition art. Consequently, a character code can be inputted through an external unit, such as a keyboard without the necessity to image-input character data or the like as a reference of examination. Accordingly, it is possible to easily and swiftly input a character code as a reference of examination. Meanwhile, good/not-good determination is possible by determining font and character shape without the necessity of previously teaching the same characters different in font type or shape.

What is claimed is:

1. An apparatus for examining printed characters, comprising:
a database storing standard characters;
means for inputting and storing a reference character;
means for acquiring an actual image of a printed character;
means for calculating a similarity degree between the actual image of the printed character and an image of a standard character stored in the database; and
means for retrieving a first candidate character having a highest similarity degree to the printed character from the standard characters stored in the database and comparing the first candidate character with the reference character;
wherein if the first candidate character retrieved from the database equates to the reference character, the printed character is determined to be correct, and if the first candidate character retrieved from the database does not equate to the reference character, the printed character is determined to be incorrect.

2. The apparatus according to claim 1, wherein the similarity degree is calculated in accordance with luminance values.

3. The apparatus according to claim 1, wherein a plurality of reference characters are compared with a plurality of first candidate characters retrieved from the database based on the actual image of a plurality of printed characters, and the determination whether the plurality of printed characters are correct is made by finding whether the plurality of first candidate characters retrieved from the database are all equal to the corresponding plurality of reference characters.

4. The apparatus according to claim 1, further comprising means for comparing a value of the similarity degree between the actual image of the printed character and the first candidate character with a predetermined threshold value to determine whether the printed character is in an allowable range.

5. The apparatus according to claim 1, wherein a second candidate character having a second-highest similarity degree to the printed character is retrieved from the database in addition to the first candidate character, and if the first character equates to the reference character, the printed character is determined to be correct only if the similarity degree of the first candidate character to the printed character exceeds the similarity degree of the second candidate character to the printed character by a predetermined threshold value.

6. The apparatus according to claim 1, further comprising a similar image character table that contains a character having an image similar to the image of the standard character, wherein if the first candidate character retrieved from the database does not equate to the reference character, the reference character is then compared with the character contained in the similar image character table and determined whether the character contained in the similar image character table equates to the reference character.

7. A method for examining printed characters, comprising:
storing standard characters in a database;
inputting and storing a reference character;
acquiring an actual image of a printed character;
calculating a similarity degree between the actual image of the printed character and an image of a standard character stored in the database; and
retrieving a first candidate character having a highest similarity degree to the printed character from the database and comparing the first candidate character with the reference character;
wherein if the first candidate character retrieved from the database equates to the reference character, the printed character is determined to be correct, and if the first candidate character retrieved from the standard characters stored in the database does not equate to the reference character, the printed character is determined to be incorrect.

8. The method according to claim 7, wherein the similarity degree is calculated in accordance with luminance values.

9. The method according to claim 7, wherein a plurality of reference characters are compared with a plurality of first candidate characters retrieved from the database based on actual images of a plurality of printed characters, and the determination whether the plurality of printed characters are correct is made by finding whether the plurality of first candidate characters retrieved from the database are all equal to the corresponding plurality of reference characters.

10. The apparatus according to claim 7, further comprising means for comparing a value of the similarity degree between the actual image of the printed character and the first candidate character with a predetermined threshold value to determine whether the printed character is within a allowable range.

11. The method according to claim 7, wherein a second candidate character having a second-highest similarity degree to the printed character is retrieved from the database in addition to the first candidate character, and if the first character equates to the reference character, the printed character is determined to be correct only if the similarity degree of the first candidate character to the printed character exceeds the similarity degree of the second candidate character to the printed character by a predetermined threshold value.

12. The method according to claim 7, further comprising preparing a similar image character table that contains a character having an image that is similar to the image of the standard character, wherein if the first candidate character retrieved from the database equates to the reference character, the reference character is then compared with the character contained in the similar image character table and determined whether the character contained in the similar image character table equates to the reference character.

* * * * *